US012603400B2

(12) United States Patent
Hidaka et al.

(10) Patent No.: US 12,603,400 B2
(45) Date of Patent: Apr. 14, 2026

(54) ENERGY STORAGE APPARATUS

(71) Applicant: GS Yuasa International Ltd., Kyoto (JP)

(72) Inventors: Tsuyoshi Hidaka, Rittoshi (JP);
Tomohiro Kawauchi, Rittoshi (JP);
Toshiki Kusunoki, Rittoshi (JP);
Yasutaka Miyawaki, Kyoto (JP);
Masaaki Mima, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 668 days.

(21) Appl. No.: 17/770,263

(22) PCT Filed: Oct. 22, 2020

(86) PCT No.: PCT/JP2020/039723
§ 371 (c)(1),
(2) Date: Apr. 19, 2022

(87) PCT Pub. No.: WO2021/079935
PCT Pub. Date: Apr. 29, 2021

(65) Prior Publication Data
US 2022/0384920 A1     Dec. 1, 2022

(30) Foreign Application Priority Data

Oct. 23, 2019   (JP) ................................. 2019-192446
Oct. 23, 2019   (JP) ................................. 2019-192450

(51) Int. Cl.
H01M 50/553      (2021.01)
H01M 50/209      (2021.01)
(Continued)

(52) U.S. Cl.
CPC ....... H01M 50/553 (2021.01); H01M 50/209 (2021.01); H01M 50/507 (2021.01); H01M 50/519 (2021.01)

(58) Field of Classification Search
CPC . H01M 50/50–503; H01M 50/507–51; H01M 50/514; H01M 50/517;
(Continued)

(56) References Cited

U.S. PATENT DOCUMENTS 4,637,965 A     1/1987   Davis
6,482,541 B1 *   11/2002   Bator, Jr. ............ H01M 50/224
                                    429/96
(Continued)

FOREIGN PATENT DOCUMENTS

DE        9218943 U1    5/1996
EP         3113249 A1    1/2017
(Continued)

OTHER PUBLICATIONS

Machine translation of Eom, KR-20170050508-A. Originally available May 11, 2017. (Year: 2017).*
(Continued)

*Primary Examiner* — Nicole M. Buie-Hatcher
*Assistant Examiner* — Jacob Buchanan
(74) *Attorney, Agent, or Firm* — McGinn IP Law Group, PLLC

(57) ABSTRACT

An energy storage apparatus includes an energy storage unit including a plurality of energy storage devices, a first power cable connected to one of a positive electrode connection terminal of the energy storage unit and a negative electrode connection terminal of the energy storage unit and extending from an end portion of the energy storage unit to an outside of the energy storage unit, and a second power cable connected to the other of the positive electrode connection
(Continued)

terminal and the negative electrode connection terminal and extending from the end portion of the energy storage unit to the outside of the energy storage unit. The first power cable includes a first connector. The second power cable includes a second connector including a structure which allows direct connection to the first connector. The first power cable is placed in a posture which inhibits connection between the first connector and the second connector.

20 Claims, 13 Drawing Sheets

(51) Int. Cl.
*H01M 50/507* (2021.01)
*H01M 50/519* (2021.01)

(58) Field of Classification Search
CPC ..... H01M 50/519; H01M 50/528–529; H01M 50/552–553; H01M 50/564; H01M 50/567; H01M 50/204–211; H01M 50/233–242; H01M 50/244
See application file for complete search history.

(56) References Cited

U.S. PATENT DOCUMENTS

| | | | |
|---|---|---|---|
| 2011/0020686 A1* | 1/2011 | Yamamoto | H01M 10/613 |
| | | | 429/120 |
| 2012/0251855 A1 | 10/2012 | Miyawaki et al. | |
| 2012/0263989 A1* | 10/2012 | Byun | H01M 50/271 |
| | | | 361/752 |
| 2014/0087229 A1 | 3/2014 | Watanabe et al. | |
| 2014/0342212 A1* | 11/2014 | Goesmann | H01M 10/0413 |
| | | | 429/121 |
| 2014/0370341 A1* | 12/2014 | Oshiba | H01M 50/514 |
| | | | 429/82 |
| 2015/0280190 A1* | 10/2015 | Ohshiba | H01M 50/209 |
| | | | 429/100 |

| | | | |
|---|---|---|---|
| 2015/0283965 A1 | 10/2015 | Lynds | |
| 2016/0072112 A1 | 3/2016 | Smith et al. | |
| 2016/0133907 A1 | 5/2016 | Shitamichi et al. | |
| 2016/0172651 A1 | 6/2016 | Ichikawa et al. | |
| 2017/0196275 A1 | 7/2017 | Tam et al. | |
| 2017/0271721 A1 | 9/2017 | Cho | |
| 2018/0190964 A1* | 7/2018 | Caumont | H01G 11/78 |
| 2018/0309099 A1 | 10/2018 | Osako | |
| 2019/0097202 A1 | 3/2019 | Morone et al. | |
| 2019/0157851 A1 | 5/2019 | Okamoto et al. | |
| 2019/0221816 A1* | 7/2019 | Yanagida | H01M 50/503 |
| 2019/0222003 A1* | 7/2019 | Yanagida | H01R 11/282 |

FOREIGN PATENT DOCUMENTS

| | | | | | |
|---|---|---|---|---|---|
| JP | S62-128437 | A | 6/1987 | | |
| JP | H05-275075 | A | 10/1993 | | |
| JP | 2001-102043 | A | 4/2001 | | |
| JP | 2012-138284 | A | 7/2012 | | |
| JP | 2012-204296 | A | 10/2012 | | |
| JP | 2013-168344 | A | 8/2013 | | |
| JP | 2013-171728 | A | 9/2013 | | |
| JP | 2014-067648 | A | 4/2014 | | |
| JP | 2015-002164 | A | 1/2015 | | |
| JP | 2016-039096 | A | 3/2016 | | |
| JP | 2016-115544 | A | 6/2016 | | |
| JP | 2016-171028 | A | 9/2016 | | |
| JP | 2017-174702 | A | 9/2017 | | |
| JP | 2017-527956 | A | 9/2017 | | |
| JP | WO2017/179650 | A1 | 1/2019 | | |
| JP | 2019-061866 | A | 4/2019 | | |
| JP | 2019-125476 | A | 7/2019 | | |
| JP | 2019-125477 | A | 7/2019 | | |
| KR | 20170050508 | A | * 5/2017 | | H01M 10/425 |
| WO | WO 2017/072974 | A1 | 5/2017 | | |

OTHER PUBLICATIONS

International Search Report (ISR) (PCT Form PCT/ISA/210), in PCT/JP2020/039723, dated Dec. 28, 2020.

* cited by examiner

Fig. 7

ENERGY STORAGE APPARATUS

TECHNICAL FIELD

The present invention relates to an energy storage apparatus including a plurality of energy storage devices.

BACKGROUND ART

Patent Document 1 discloses a battery module including a plurality of battery cells connected in series. This battery module has one end of a conductor to which an electrode terminal of a unit cell is connected, with the other end of the conductor being provided with a connector housing. The connector housing of one of the two adjacent unit cells and the connector housing of the unit cell are both fitted to the relay connector housing. As a result, the two unit cells are connected in series.

PRIOR ART DOCUMENT

Patent Documents

Patent Document 1: JP-A-2013-171728
Patent Document 2: JP-A-2012-204296

SUMMARY OF THE INVENTION

Problems to be Solved by the Invention

Conventionally, there is a case where a relay connector is used for electrical connection between two energy storage apparatuses adjacent to each other as between battery cells in the conventional battery module. In this case, the positive electrode or negative electrode connector of one of the two energy storage apparatuses and the opposite electrode connector of the other energy storage apparatus are configured to be inserted into the relay connector. Accordingly, a tool such as a wrench is unnecessary. However, when the number of energy storage apparatuses to be connected is large, the number of necessary relay connectors is also large, and the burden of work, cost, or the like regarding transportation, storage, and the like of the large number of relay connectors becomes large. Accordingly, the inventors of the present application have studied a structure configured to directly connect the connectors of two energy storage apparatuses without using any relay connector. As a result, the present inventors have found that there is a possibility that the positive electrode and negative electrode connectors of one energy storage apparatus are erroneously connected.

The present invention has been made by the inventors of the present application focusing newly on the above problems, and the first object of the present invention is to provide an energy storage apparatus including a plurality of energy storage devices and having improved safety.

Means for Solving the Problems

An energy storage apparatus according to one aspect of the present invention includes an energy storage unit including a plurality of energy storage devices, a first power cable connected to one of a positive electrode connection terminal of the energy storage unit and a negative electrode connection terminal of the energy storage unit and extending from an end portion of the energy storage unit to an outside of the energy storage unit, and a second power cable connected to the other of the positive electrode connection terminal and the negative electrode connection terminal and extending from the end portion of the energy storage unit to the outside of the energy storage unit. The first power cable includes a first connector, the second power cable includes a second connector including a structure which allows direct connection to the first connector, and the first power cable is placed in a posture which inhibits connection between the first connector and the second connector.

Advantages of the Invention

According to the present invention, it is possible to provide an energy storage apparatus including a plurality of energy storage devices and having improved safety.

BRIEF DESCRIPTION OF THE DRAWINGS

FIG. 7 is an enlarged perspective view showing an aspect of the electrical connection between two energy storage apparatuses in the energy storage equipment according to the first embodiment.

MODE FOR CARRYING OUT THE INVENTION

Figure 1:
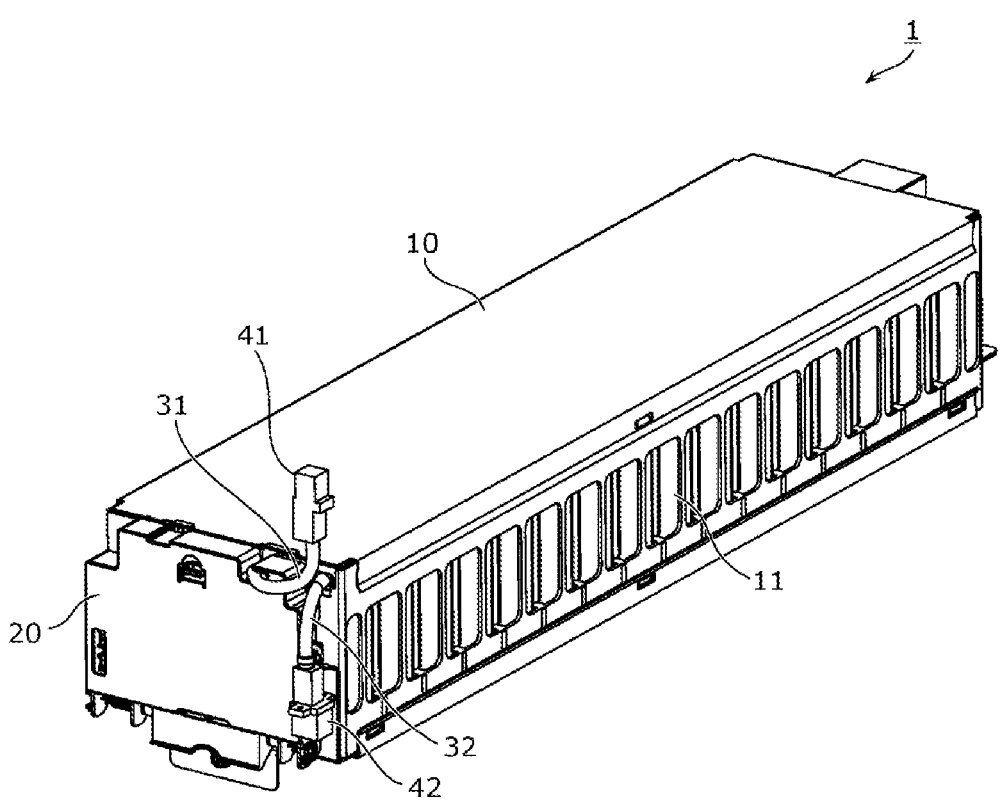
FIG. 1 is a perspective view showing an external appearance of an energy storage apparatus according to the first embodiment.
Figure 1:
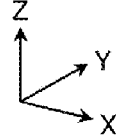

An energy storage apparatus according to one aspect of the present invention includes an energy storage unit including a plurality of energy storage devices, a first power cable connected to one of a positive electrode connection terminal of the energy storage unit and a negative electrode connection terminal of the energy storage unit and extending from an end portion of the energy storage unit to an outside of the energy storage unit, and a second power cable connected to the other of the positive electrode connection terminal and the negative electrode connection terminal and extending from the end portion of the energy storage unit to the outside of the energy storage unit. The first power cable includes a first connector, the second power cable includes a second connector including a structure which allows direct connection to the first connector, and the first power cable is placed in a posture which inhibits connection between the first connector and the second connector.

According to this configuration, in the energy storage apparatus according to the present aspect, since the first connector includes a structure that allows direct connection to the second electrode connector, arranging a plurality of energy storage apparatuses can form energy storage equipment having a large capacity as a whole. Since the first connector of the one energy storage apparatus and the second connector of the one energy storage apparatus are provided in a physically unconnectable state, a short circuit due to erroneous connection between the first connector of the one energy storage apparatus and the second connector of the one energy storage apparatus does not occur. As described above, the energy storage apparatus according to this aspect is an energy storage apparatus with improved safety.

The first power cable may be placed in a posture which inhibits connection between the first connector and the second connector by fixing a portion of the first power cable to the energy storage unit, the portion extending from the energy storage unit.

According to this configuration, for example, the first connector in the first electrode power cable is fixed. Alternatively, the cable portion of the first electrode power cable which is located near the first connector is fixed. This can prevent erroneous connection between the first connector and the second connector of the energy storage apparatus and can fix the first electrode power cable in a direction suitable for connection with another energy storage apparatus.

The energy storage unit further may include a plate-like base member that supports the plurality of energy storage devices, and the base member may include a fixing portion that fixes the first power cable.

As described above, for example, since the fixing portion is provided on the base member made of a metal such as iron, the first electrode power cable can be firmly or reliably fixed. As a result, the first connector is more reliably maintained in a predetermined posture. Therefore, the reliability or validity of connection with another connector in the first connector is improved.

The first connector may be placed in a posture in a direction opposite to a direction in which the second connector is inserted into a first connector of another energy storage apparatus when the second connector is connected to the first connector of the another energy storage apparatus.

With such a configuration, one energy storage apparatus and the two other energy storage apparatuses which sandwich the one energy storage apparatus can be arranged in a row, and these energy storage apparatuses can be electrically connected in series to each other. That is, each of the plurality of energy storage apparatuses arranged in a row is safely and easily connected to the energy storage apparatus to be connected.

The energy storage apparatus may further include a board unit including a board electrically connected to the energy storage unit. The board unit may be placed at the end portion of the energy storage unit.

As described above, the board unit is disposed at the end portion of the energy storage unit from which the first electrode power cable and the second electrode power cable are drawn out. Therefore, by disposing the energy storage apparatus such that the end portion of the energy storage unit faces the passage side where the worker moves back and forth, it is possible to facilitate maintenance of the board unit or the board or connection work between the first connector and the second connector.

Each of the plurality of energy storage devices may include a terminal placement surface on which an electrode terminal is placed. The energy storage apparatus may further include an insulating member including a portion collectively covering at least a part of each of the terminal placement surfaces of the plurality of energy storage devices and a conductive member connected to a terminal surface of the electrode terminal of a predetermined energy storage device which is one of the plurality of energy storage devices. The terminal surface may be an upper surface of the electrode terminal and a lower end portion of the insulating member may be positioned below the terminal surface in an up/down direction when the plurality of energy storage devices are placed in a posture in which the terminal placement surface faces upward. The insulating member may include a wall portion positioned on a side of the predetermined energy storage device. The wall portion may include a first opening portion through which the conductive member is placed so as to penetrate and which is provided in a range including the same position as the terminal surface in the up/down direction.

According to this configuration, a conductive member such as the cable connected to the terminal surface of an electrode terminal can be easily extracted to the outside of an insulating member from the same height position as the terminal surface through the first opening portion. Accordingly, even if there is a portion of the conductive member having a large outer diameter near the connection terminal used for connection with the electrode terminal, the connection terminal of the conductive member can be connected to the electrode terminal in a state of being in contact with the terminal surface of the electrode terminal. That is, it is not necessary to use another conductive member interposed between the conductive member and the terminal surface, which is necessary when the conductive member passes over the wall portion. As described above, according to the energy storage apparatus of this aspect, the configuration can be simplified.

The first opening may be a notch provided at the lower end portion of the insulating member.

According to this configuration, the insulating member can be disposed with respect to the plurality of energy storage devices in a state where the conductive member is connected to the electrode terminal. Therefore, it is possible to perform connection work (fastening of a nut or the like) of the conductive member to the electrode terminal without being disturbed by the insulating member. Therefore, according to the energy storage apparatus of this aspect, the manufacturing work can be facilitated while the configuration is simplified.

The insulating member may include a restricting portion that is positioned above the conductive member in the first opening portion and restricts upward movement of the conductive member.

According to this configuration, since the conductive member is suppressed from moving or tilting upward at the position of the first opening portion, the restricting portion functions as a temporary presser before the conductive member is connected to the electrode terminal. The semi-finished product can be easily handled after the conductive member is connected to the electrode terminal. That is, according to the energy storage apparatus of this aspect, it is possible to improve the manufacturing efficiency while simplifying the configuration.

The energy storage apparatus may further include a case which is opened at an upper side and houses the plurality of energy storage devices, wherein an upper end portion of the case is positioned above a terminal surface of the electrode terminal in the up/down direction, is disposed at a position facing the first opening portion, and includes a second opening portion through which the conductive member is placed.

With such a configuration, the case which houses the plurality of energy storage devices can cover the plurality of energy storage devices up to a height position which includes the conductive member connected to the predetermined energy storage device, and hence the insulating member can be fixed to the case. Therefore, the strength of the case as a structure covering the plurality of energy storage devices is improved. Since the second opening portion is provided in the case, the lead-out structure of the conductive member from the case is not hindered by the case. That is, according to the energy storage apparatus of this aspect, the structural stabilization is also achieved while the configuration is simplified.

The insulating member may be a bus bar frame which holds one or more bus bars which electrically connect the plurality of energy storage devices to each other.

According to this configuration, since the bus bar frame covers the portion below the terminal surface of the electrode terminal, unnecessary conduction between the electrode terminal and another member can be prevented, and the conductive member can be directly connected to the electrode terminal in a reasonable posture by the first opening portion. That is, it is possible to efficiently use an insulating member while simplifying the configuration.

An energy storage apparatus and energy storage equipment according to an embodiment of the present invention (including its modification example) will be described below with reference to the accompanying drawings. Each embodiment described below shows a comprehensive or specific example. Numerical values, shapes, materials, components, placement positions and connection modes of the components, and the like presented in the following embodiment are merely examples, and are not intended to limit the present invention. In each drawing, dimensions and the like are not strictly shown.

In the following description and drawings, an alignment direction of a pair of electrode terminals (on the positive electrode side and the negative electrode side) of one energy storage device, a direction in which the short side surfaces of a case of the energy storage devices face each other, or a direction in which the long side surfaces of an outer case of the energy storage unit face each other is defined as the X-axis direction. An alignment direction of the plurality of energy storage devices, a direction in which the long side surfaces of a case of the energy storage devices face each other, a direction in which the short side surfaces of an outer case of the energy storage unit face each other, or an alignment direction of the energy storage unit and the board unit is defined as the Y-axis direction. An alignment direction of the base member of the energy storage unit and the outer case lid body, an alignment direction of the energy storage device and the bus bar, an alignment direction of the case body of the energy storage device and the lid portion of the energy storage device, or the up/down direction is defined as the Z-axis direction. The X-axis direction, the Y-axis direction, and the Z-axis direction are directions intersecting (orthogonal in the present embodiment) each other. Although the Z-axis direction may not be the up/down direction depending on the usage mode, the Z-axis direction will be described below as the up/down direction for convenience of description.

In the following description, for example, an X-axis plus direction indicates the arrow direction of the X axis, and an X-axis minus direction indicates a direction opposite to the X-axis plus direction. The same applies to the Y-axis direction and the Z-axis direction. Expressions indicating relative directions or postures, such as parallel and orthogonal, are not limited to the exact meanings of the expressions. For example, two directions being orthogonal to each other not only means that the two directions are perfectly orthogonal to each other, but also means that the two directions are substantially orthogonal to each other, that is, the two directions include a difference of, for example, about several percent.

First Embodiment 1-1. General Description of Energy Storage Apparatus

Figure 2:
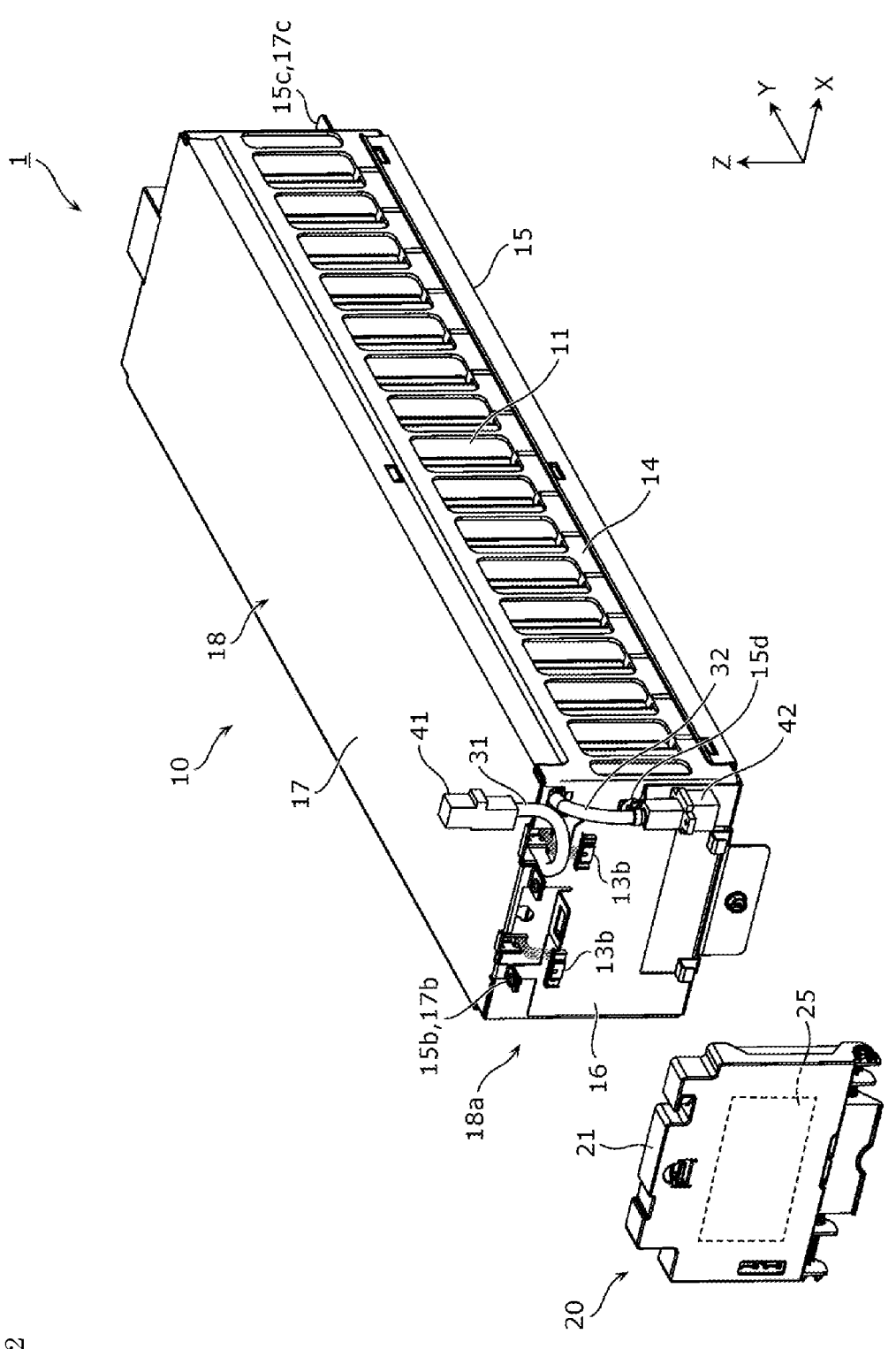
FIG. 2 is a perspective view showing the configuration when the energy storage apparatus according to the first embodiment is separated into an energy storage unit and a board unit.
Figure 3:
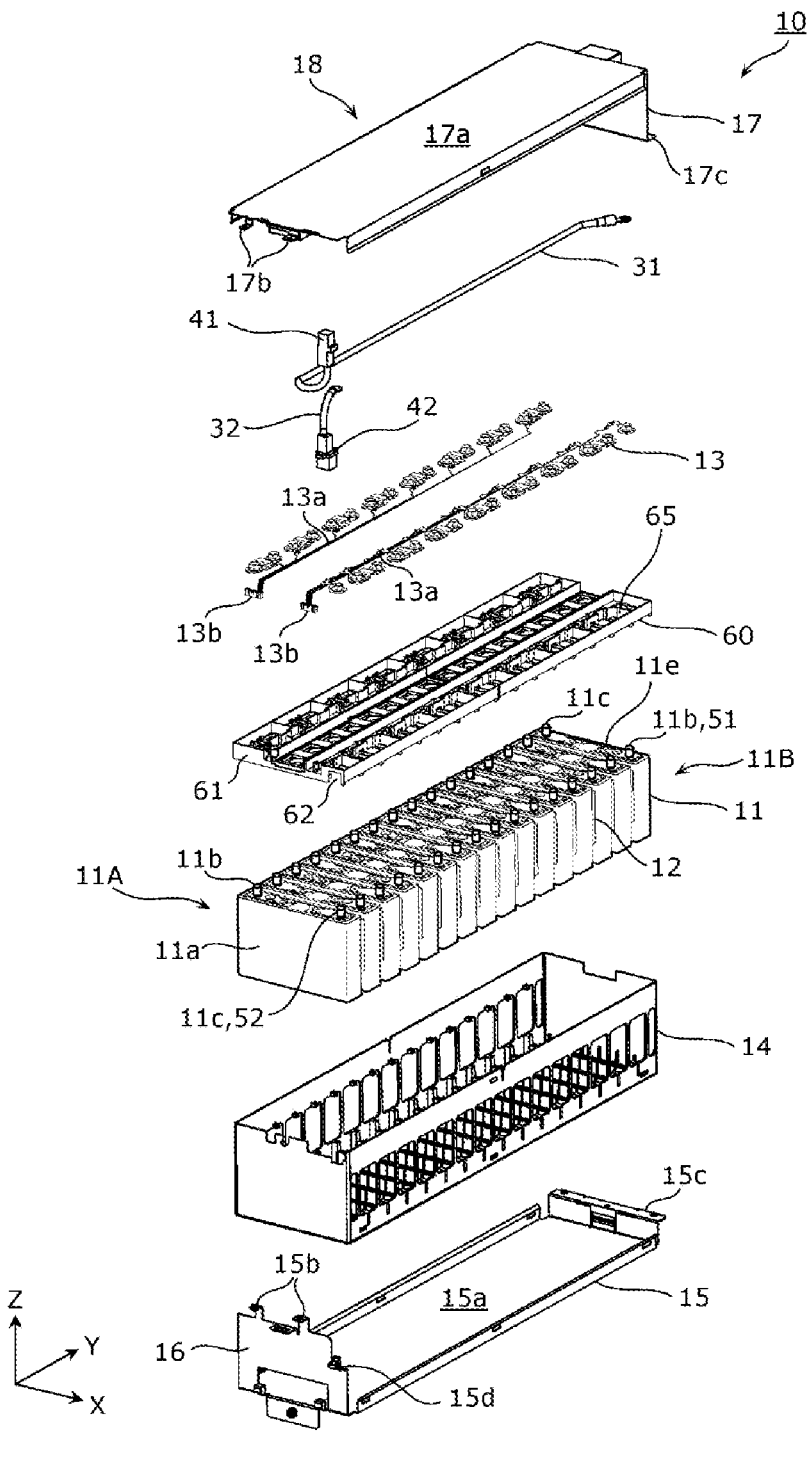
FIG. 3 is an exploded perspective view showing each component when the energy storage unit according to the first embodiment is disassembled.

The configuration of an energy storage apparatus 1 according to the present embodiment will be described first. FIG. 1 is a perspective view showing an external appearance of the energy storage apparatus 1 according to the present embodiment. FIG. 2 is a perspective view showing the configuration when the energy storage apparatus 1 according to the present embodiment is separated into an energy storage unit 10 and a board unit 20. FIG. 3 is an exploded perspective view showing each component when the energy storage unit 10 according to the present embodiment is disassembled.

The energy storage apparatus 1 is an apparatus capable of charging electricity from the outside and discharging electricity to the outside, and has a substantially rectangular parallelepiped shape in the present embodiment. The energy storage apparatus 1 according to the present embodiment is a battery module (assembled battery) used for power storage applications, power supply applications, and the like. More specifically, the energy storage apparatus 1 is used, for example, as a stationary battery provided in energy storage equipment 100 that accumulates and outputs electric power generated by a generator. The energy storage equipment 100 includes a plurality of energy storage apparatuses 1 electrically connected to each other. The configuration of the energy storage equipment 100 will be described later with reference to FIGS. 6 and 7.

The energy storage apparatus 1 can be used not only as a stationary battery used for home use, a generator, and the like, but also for various energy storage applications, power supply applications, and the like. The energy storage apparatus 1 can also be used as, for example, a battery or the like for driving or engine starting for a moving body such as an automobile, a motorcycle, a watercraft, a ship, a snowmobile, an agricultural machine, a construction machine, or a railway vehicle for electric railway. Examples of the automobile include an electric vehicle (EV), a hybrid electric vehicle (HEV), a plug-in hybrid electric vehicle (PHEV), and a gasoline vehicle. Examples of the railway vehicle for an electric railway include a train, a monorail, and a linear motor car.

As shown in FIGS. 1 to 3, the energy storage apparatus 1 includes the energy storage unit 10 and the board unit 20 attached to the energy storage unit 10. The energy storage unit 10 is a battery module (assembled battery) having a substantially rectangular parallelepiped shape elongated in the Y-axis direction. More specifically, the energy storage unit 10 includes a plurality of energy storage devices 11, a bus bar frame 60, a plurality of bus bars 13, an outer case body 14 that accommodates them, an outer case 18 constituted by a base member 15 and an outer case lid body 17. A positive electrode power cable 31 and a negative electrode power cable 32 are connected to the energy storage unit 10. The energy storage unit 10 may include binding members (end plates, side plates, and the like) for binding the plurality of energy storage devices 11.

The energy storage device 11 is a secondary battery (unit cell) capable of charging and discharging electricity, and more specifically, is a nonaqueous electrolyte secondary battery such as a lithium ion secondary battery. The energy storage device 11 has a flat rectangular parallelepiped (prismatic) shape, and in the present embodiment, sixteen energy storage devices 11 are arranged side by side in the Y-axis direction. The shape, placement position, number, and the like of the energy storage devices 11 are not particularly limited. The energy storage device 11 is not limited to a nonaqueous electrolyte secondary battery and may be a secondary battery other than the nonaqueous electrolyte secondary battery, or may be a capacitor. The energy storage device 11 may be not a secondary battery but a primary battery that allows the user to use stored electricity without charged electricity. The energy storage device 11 may be a battery using a solid electrolyte. The energy storage device 11 may be a laminate type energy storage device.

More specifically, the energy storage device 11 includes a case 11*a* made of a metal, and a lid portion of the case 11*a* is provided with a positive electrode terminal 11*b* and a negative electrode terminal 11*c* which are electrode terminals made of a metal. That is, the lid portion of the case 11*a* forms a terminal placement surface 11*e* on which the electrode terminals (the positive electrode terminal 11*b* and the negative electrode terminal 11*c*) are placed. A spacer 12 is disposed between the adjacent energy storage devices 11. The lid portion (terminal placement surface 11*e*) of the case 11*a* may be provided with an electrolytic solution filling unit for filling an electrolyte solution, a gas release valve for releasing a pressure by discharging a gas when the pressure in the case 11*a* rises, and the like. In the case 11*a*, an electrode assembly (also referred to as an energy storage element or a power generating element), a current collector (a positive electrode current collector and a negative electrode current collector), and the like are placed, and an electrolytic solution (nonaqueous electrolyte) and the like are sealed. However, a detailed description of them will be omitted.

The positive electrode terminal 11*b* and the negative electrode terminal 11*c* are placed so as to protrude upward (Z-axis plus direction) at both end portions in the longitudinal direction (X-axis direction) of the terminal placement surface 11*e* of the case 11*a*. The energy storage devices 11 are electrically connected to each other, and the outermost positive electrode terminal 11*b* and the outermost negative electrode terminal 11*c* of the plurality of energy storage devices 11 are connected to the power cable. This allows the energy storage apparatus 1 (energy storage unit 10) to charge electricity from the outside and discharge electricity to the outside.

More specifically, as shown in FIG. 3, the positive electrode terminal 11*b* of the energy storage device 11 disposed at an end portion of the plurality of energy storage devices 11 in the Y-axis plus direction functions as a total plus terminal of the plurality of energy storage devices 11 (a positive electrode connection terminal 51 of the energy storage unit 10). That is, in the inside of the outer case 18, the positive electrode power cable 31 is connected to the positive electrode connection terminal 51 of the energy storage unit 10. The negative electrode terminal 11*c* of the energy storage device 11 disposed at an end portion of the plurality of energy storage devices 11 in the Y-axis minus direction functions as a total minus terminal of the plurality of energy storage devices 11 (a negative electrode connection terminal 52 of the energy storage unit 10). That is, in the inside of the outer case 18, the negative electrode power cable 32 is connected to the negative electrode connection terminal 52 of the energy storage unit 10. The positive electrode terminal 11*b* or the negative electrode terminal 11*c* of the energy storage device 11 positioned at the end portion in the electrical connection of the plurality of energy storage devices 11 is handled as the positive electrode connection terminal 51 or the negative electrode connection terminal 52. Accordingly, for example, the positive electrode terminal 11*b* or the negative electrode terminal 11*c* of the energy storage device 11 in the middle of the row of the plurality of energy storage devices 11 arranged in a row may be handled as the positive electrode connection terminal 51 or the negative electrode connection terminal 52. In each of FIG. 3 and subsequent drawings, the energy storage device 11 at an end portion in the Y-axis plus direction may be referred to as an energy storage device 11B, and the energy storage device 11 at an end portion in the Y-axis minus direction may be referred to as an energy storage device 11A. In this case, the positive electrode terminal 11*b* of the energy storage device 11B functions as the positive electrode connection terminal 51 of the energy storage unit 10, and the negative electrode terminal 11*c* of the energy storage device 11A functions as the negative electrode connection terminal 52 of the energy storage unit 10. In the second embodiment to be described later, the energy storage device 11A is an example of a predetermined energy storage device to which the negative electrode power cable 32 which is an example of a conductive member is connected.

In the first embodiment, the positive electrode connection terminal 51 (the negative electrode connection terminal 52) and the positive electrode power cable 31 (the negative electrode power cable 32) need not be directly connected to each other. An output terminal bus bar may be connected to the positive electrode terminal 11*b* which is the positive electrode connection terminal 51, and the positive electrode power cable 31 may be connected to the output terminal bus bar. The positive electrode power cable 31 and the negative electrode power cable 32 each need not be formed of a single cable. The first cable connected to the positive electrode terminal 11*b* which is the positive electrode connection terminal 51 may be connected to a relay member (bus bar or the like) on the electric circuit, and the other end of the second cable provided with a positive electrode connector 41 at one end may be connected to the relay member. That is, a conductive member such as a bus bar may be interposed on the conduction path of the positive electrode power cable 31.

As described above, in the present embodiment, the positive electrode terminal 11b and the negative electrode terminal 11c of the energy storage device 11 are arranged side by side in the direction (X-axis direction) intersecting the alignment direction (Y-axis direction) of the plurality of energy storage devices 11 on one side surface of the case 11a. The number of the energy storage devices 11 is an even number (16 in the present embodiment), and the even number of energy storage devices 11 are connected in series.

Figure 9:
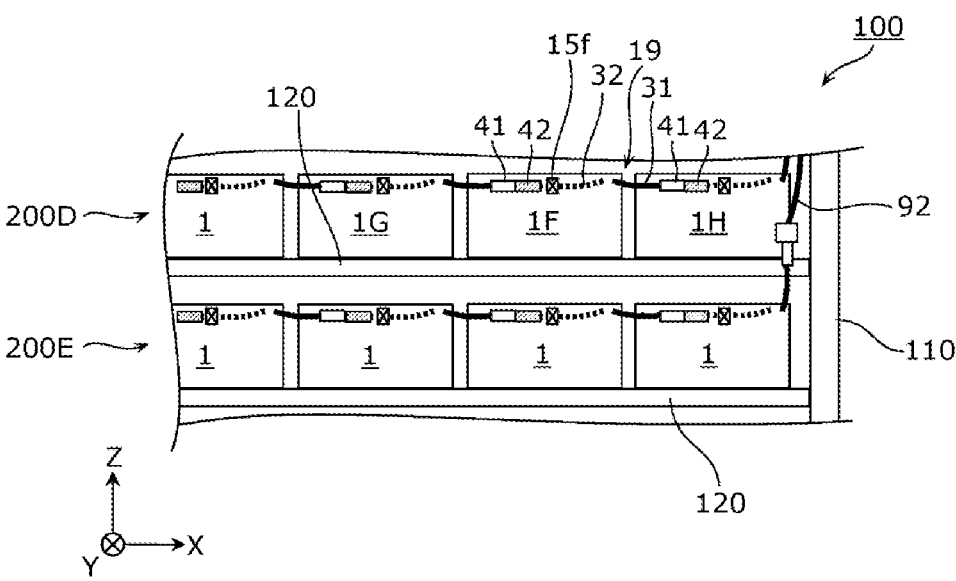
FIG. 9 is a partial front view showing a configuration outline of energy storage equipment according to the first modification example of the first embodiment.

According to this configuration, since the number of the energy storage devices 11 is an even number, the positive electrode connection terminal 51 and the negative electrode connection terminal 52 of the energy storage unit 10 are placed on the same side in the X-axis direction (on the X axis plus direction side in the present embodiment). Accordingly, it is easy to place the positive electrode connector 41 and a negative electrode connector 42 in the same straight line. In each energy storage apparatus 1, since the opposite side in the X-axis direction (in the present embodiment, the X axis minus direction side) is vacant, as shown in FIG. 9, it is easy to connect one negative electrode connector 42 of two energy storage apparatuses 1 adjacent to each other in the left/right direction (X-axis direction) to the other positive electrode connector 41. That is, since there is an empty space near an end portion 18a of the energy storage apparatus 1, it is possible to secure length to route a cable for connecting connectors to each other for each of the positive electrode power cable 31 and the negative electrode power cable 32.

The positive electrode power cable 31 and the negative electrode power cable 32 are covered electric wires (also referred to as a power cable, a main circuit cable, a power supply line, and a power line) through which a current (also referred to as a charge and discharge current and a main current) for charging and discharging the energy storage apparatus 1 (energy storage unit 10) flows. The positive electrode power cable 31 and the negative electrode power cable 32 each are, for example, a relatively thick electric wire having a core wire with a cross-sectional area of about 5 mm$^2$ to 20 mm$^2$. In the present embodiment, a covered electric wire having a core wire with a cross-sectional area of about 8 mm$^2$ is employed as each of the positive electrode power cable 31 and the negative electrode power cable 32. The positive electrode connector 41 is provided at an end portion of a portion of the positive electrode power cable 31, the portion being exposed from the energy storage unit 10, and the negative electrode connector 42 is provided at an end portion of a portion of the negative electrode power cable 32, the portion being exposed from the energy storage unit 10. In the present embodiment, one of the positive electrode power cable 31 and the negative electrode power cable 32 is an example of the first electrode power cable, and the other is an example of the second electrode power cable. The positive electrode connector 41 or the negative electrode connector 42 provided at an end portion of the positive electrode power cable 31 or the negative electrode power cable 32, which is the first power cable, is an example of the first connector. The positive electrode connector 41 or the negative electrode connector 42 provided at an end portion of the positive electrode power cable 31 or the negative electrode power cable 32, which is the second power cable, is an example of the second connector. The placement positions and the like of these power cables and connectors will be described later with reference to FIGS. 4 and 5. As shown in FIG. 2, each of the positive electrode power cable 31 and the negative electrode power cable 32 is disposed in a state of being extracted from the end portion 18a of the outer case 18 (also referred to as the end portion 18a of the energy storage unit 10) to the outside of the outer case 18. For example, "the cable is placed in a state of being extracted from the outer case 18" refers to a state in which the cable is placed so as to penetrate through the wall portion of the outer case 18. That is, in the work of arranging the positive electrode power cable 31 and the negative electrode power cable 32, the operation of actually pulling out the positive electrode power cable and the negative electrode power cable from the inside of the outer case 18 to the outside is not essential.

The bus bar frame 60 is a flat rectangular member capable of electrically insulating the bus bars 13 from other members and regulating the positions of the bus bars 13. The bus bar frame 60 is formed of an insulating member, such as polycarbonate (PC), polypropylene (PP), or polyethylene (PE), which is similar to the board case 21 of the board unit 20 described later. More specifically, the bus bar frame 60 is placed above the plurality of energy storage devices 11 and is positioned with respect to the plurality of energy storage devices 11. A plurality of bus bar openings 65 are formed in the bus bar frame 60, and the bus bar 13 is placed and positioned in each of the plurality of bus bar openings 65. With such a configuration, the bus bars 13 are positioned with respect to the plurality of energy storage devices 11 and are joined to the positive electrode terminals 11b and the negative electrode terminals 11c of the plurality of energy storage devices 11. The bus bar frame 60 also has a function of reinforcing the outer case body 14 as an inner lid of the outer case 18. The bus bar frame 60 is an example of an insulating member having a portion which collectively covers at least a part of each of the terminal placement surfaces 11e of the plurality of energy storage devices 11.

The bus bar frame 60 further includes a wall portion 61 erected on a peripheral edge of a portion where the plurality of bus bar openings 65 are formed, and a first opening portion 62 is formed in the wall portion 61. The negative electrode power cable 32 is disposed in the first opening portion 62 while penetrating through it. The structural relationship between the negative electrode power cable 32 and the bus bar frame 60 and the like will be described later in the second embodiment.

The bus bars 13 are rectangular plate-like members which are arranged on the plurality of energy storage devices 11 (the bus bar frames 60) and electrically connect the electrode terminals of the plurality of energy storage devices 11 to each other. The bus bar 13 is made of a metal such as aluminum, an aluminum alloy, copper, a copper alloy, or stainless steel. In the present embodiment, the bus bars 13 connect the positive electrode terminals 11b and the negative electrode terminals 11c of the adjacent energy storage devices 11 in order to connect the sixteen energy storage devices 11 in series. The aspect of connection of the energy storage devices 11 is not limited to the above, and series connection and parallel connection may be combined in any way.

Detection cables 13a are connected to the bus bars 13 or the electrode terminals of the energy storage devices 11. The detection cables 13a are electric wires (also referred to as communication cables, control cables, communication lines, and control lines) for voltage measurement or temperature measurement of the energy storage devices 11 or for voltage balance between the energy storage devices 11. A thermistor (not shown) for measuring the temperature of the energy storage device 11 is disposed on the bus bar 13 or the electrode terminal of the energy storage device 11. However, a description of the thermistor will be omitted. A connector 13b is connected to an end of the detection cable 13a in the Y-axis minus direction. The connector 13b is a connector connected to a board 25 of the board unit 20 described later. That is, the detection cable 13a transmits information such as the voltage and the temperature of the energy storage device 11 to the board 25 of the board unit 20 through the connector 13b. The detection cable 13a is also used for voltage balance between the energy storage devices 11 by causing the energy storage device 11 having a high voltage to discharge under the control of the board 25.

The outer case 18 is a case (module case) having a rectangular shape (box shape) which forms the outer case of the energy storage unit 10. That is, the outer case 18 is disposed outside the energy storage devices 11 and the like, fixes the energy storage devices and the like at predetermined positions, and protects the energy storage devices 11 and the like from an impact or the like. As described above, the outer case 18 includes the outer case body 14, the base member 15, and the outer case lid body 17.

The outer case body 14 is a bottomed rectangular cylindrical housing in which an opening is formed. The outer case body 14 is formed of an insulating member such as PC, PP, or PE. The base member 15 and the outer case lid body 17 are members which protect (reinforce) the outer case body 14. The base member 15 and the outer case lid body 17 each are made of a metal member such as stainless steel, aluminum, an aluminum alloy, iron, or a plated steel plate. The base member 15 and the outer case lid body 17 may be formed of members made of the same material or may be formed of members made of different materials. The outer case body 14 is an example of a case which opens upward and houses the plurality of energy storage devices 11 in the second embodiment described later.

The base member 15 is a plate-like member which supports the outer case body 14 from below (Z-axis minus direction) and also has a role of supporting the plurality of energy storage devices 11 through the outer case body 14. The base member 15 includes a bottom portion 15a, a board unit attachment portion 16, and connecting portions 15b and 15c. The bottom portion 15a is a flat plate-like and rectangular portion which forms the bottom portion of the energy storage apparatus 1 and extends in parallel to the XY plane and in the Y-axis direction, and is disposed below the outer case body 14. The board unit attachment portion 16 is a flat plate-shaped and rectangular portion which is erected in the Z-axis plus direction from an end portion of the bottom portion 15a on the Y-axis minus direction side and to which the board unit 20 is attached. The connecting portion 15b is a portion which is disposed at an end portion of the board unit attachment portion 16 on the Z axis plus direction side and projects in the Y axis minus direction, and is connected to the outer case lid body 17. The connecting portion 15c is a portion which is erected in the Z axis plus direction from an end portion of the bottom portion 15a on the Y axis plus direction side and projects in the Y axis plus direction, and is connected to the outer case lid body 17.

The outer case lid body 17 is a member disposed so as to close the opening of the outer case body 14 and has a top portion 17a and connecting portions 17b and 17c. The top portion 17a is a flat plate-like and rectangular portion which forms the upper surface portion of the energy storage apparatus 1 and extends in parallel to the XY plane and in the Y-axis direction, and is disposed above the outer case body 14. The connecting portion 17b is a portion which is disposed at an end portion of the top portion 17a on the Y-axis minus direction side, extends in the Z-axis minus direction, and protrudes in the Y-axis minus direction, and is connected to the connecting portion 15b of the base member 15. The connecting portion 17c is a portion which extends in the Z-axis minus direction from an end portion of the top portion 17a on the Y-axis plus direction side and protrudes in the Y-axis plus direction, and is connected to the connecting portion 15c of the base member 15. As described above, the base member 15 and the outer case lid body 17 are fixed by connecting the connecting portions 15b and 15c and the connecting portions 17b and 17c by screwing or the like in a state where the outer case body 14 is sandwiched from the up/down direction.

The board unit 20 is a device capable of monitoring the state of the energy storage device 11 of the energy storage unit 10 and controlling the energy storage device 11. In the present embodiment, the board unit 20 is a flat rectangular member attached to the end portion 18a (see FIG. 2) of the energy storage unit 10 of the outer case 18 in the longitudinal direction, that is, a side surface of the energy storage unit 10 on the Y-axis minus direction side. The board unit 20 includes the board case 21 (see FIG. 2) formed of an insulating member such as polycarbonate (PC), polypropylene (PP), or polyethylene (PE), and the board 25 accommodated in the board case 21. More specifically, the board unit 20 is attached to the board unit attachment portion 16 which is formed on the base member 15 of the outer case 18 of the energy storage unit 10. The board 25 is a circuit board (monitoring board) electrically connected to the energy storage unit 10. More specifically, the board 25 is electrically connected to the energy storage device 11 through the detection cable 13a and the connector 13b to acquire information such as the voltage and temperature of the energy storage device 11 and monitor a state such as the charge state and the discharge state of the energy storage device 11. The board 25 also has a function as a control circuit board that causes the energy storage device 11 to discharge by using the detection cable 13a to balance the voltage between the energy storage devices 11. A plurality of components (not shown) for implementing this function are mounted on the board 25. The board 25 may not control the energy storage device 11 but only monitor the state of the energy storage device 11, and the control based on the monitoring result may be performed by an external control device connected to the energy storage apparatus 1.

1-2. Placement of Power Cables and Connectors

The placement positions and the like of the positive electrode power cable 31, the negative electrode power cable 32, the positive electrode connector 41, and the negative electrode connector 42 in the energy storage apparatus 1 according to the first embodiment will be described next with reference to FIGS. 4 and 5.

Figure 4:
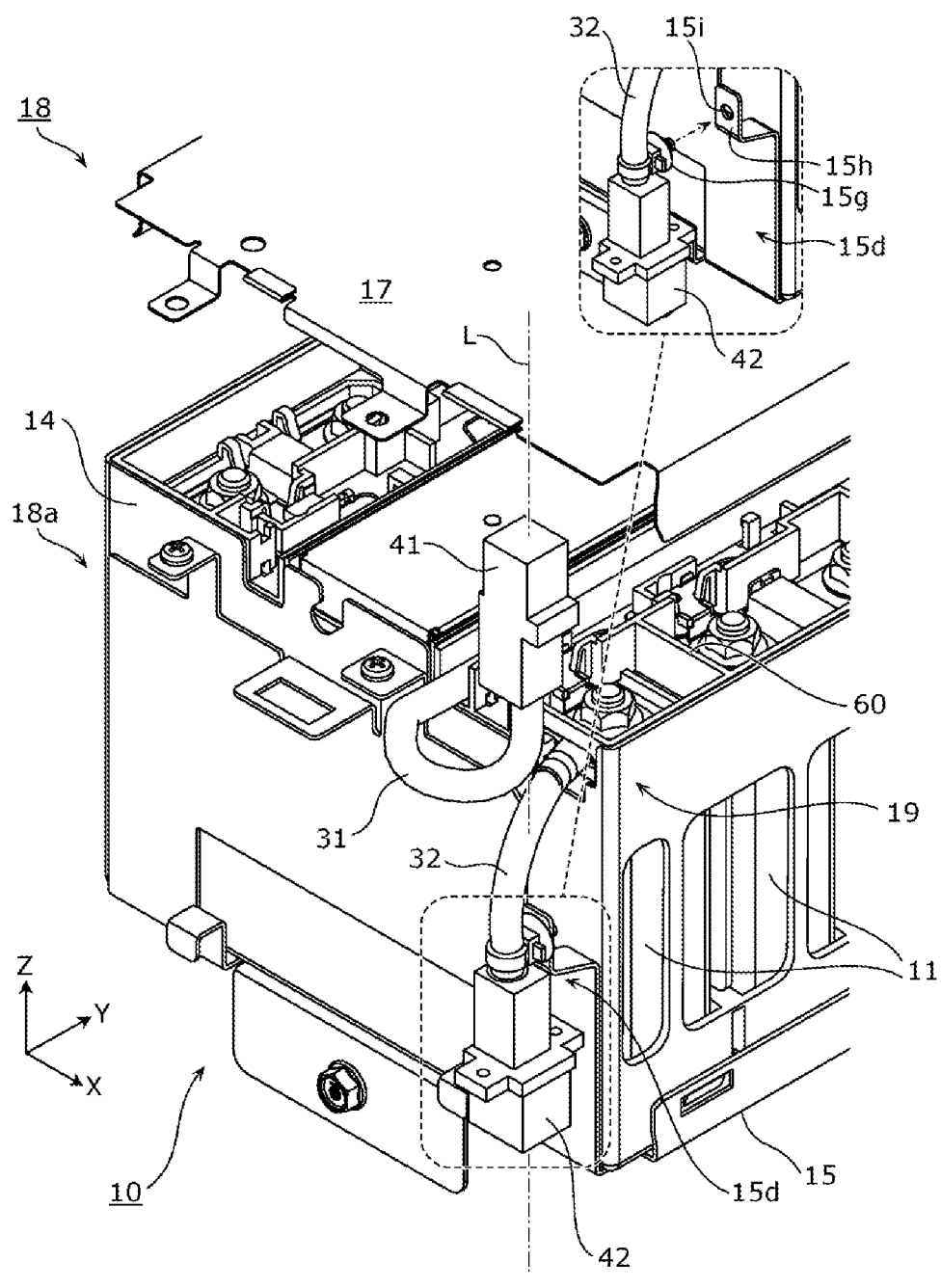
FIG. 4 is a perspective view showing the configuration of an end portion of the outer case of the energy storage unit according to the first embodiment.

FIG. 4 is a perspective view showing the configuration of the end portion 18a of the outer case 18 of the energy storage unit 10 according to the embodiment. More specifically, FIG. 4 shows the end portion 18a of the outer case 18 in a state where the outer case lid body 17 is lifted from the outer case body 14. The end portion 18a of the outer case 18 in the Y-axis minus direction is also an end portion as the energy storage unit 10. Therefore, "the end portion 18a of the outer case 18" can be rephrased as "the end portion 18a of the energy storage unit 10". The same applies to expressions such as "extended from the outer case 18", and the "outer case 18" can be replaced with the "energy storage unit 10". FIG. 5 is a view for explaining an example of the range of a corner portion 19 of the outer case 18 according to the embodiment.

As shown in FIG. 4, the positive electrode power cable 31 and the negative electrode power cable 32 are placed while extending from the inside of the outer case 18 to the outside. More specifically, both the positive electrode power cable 31 and the negative electrode power cable 32 extend from the end portion 18*a* of the outer case 18 toward the outside of the outer case 18. The positive electrode power cable 31 has the positive electrode connector 41, and the negative electrode power cable 32 has the negative electrode connector 42. Although not shown in FIG. 4, a terminal or the like for electrical connection with a mating connector is disposed on each of the positive electrode connector 41 and the negative electrode connector 42.

In the present embodiment, the positive electrode connector 41 and the negative electrode connector 42 have structures that allow direct connection with each other. One of the negative electrode connector 42 and the positive electrode connector 41 is mechanically connected (insertion, fitting, screwing, or the like) to the other, thereby electrically connecting the negative electrode connector 42 and the positive electrode connector 41 to each other. With such a configuration, the one positive electrode connector 41 and the other negative electrode connector 42 of the two adjacent energy storage apparatuses 1 can be easily connected to each other without using a tool such as a wrench. The adjacent energy storage apparatuses 1 can be electrically connected to each other without separately preparing a connection cable and the like.

The adjacent energy storage apparatuses 1 have the same structure, and the positive electrode connector 41 of the one energy storage apparatus 1 of the two adjacent energy storage apparatuses 1 is connected to the negative electrode connector 42 of the other energy storage apparatus 1. As for the one energy storage apparatus 1, as a single member, the positive electrode connector 41 and the negative electrode connector 42 can be connected to each other. However, the positive electrode connector 41 and the negative electrode connector 42 of the one energy storage apparatus 1 are disposed in a state where direct connection with each other is impossible. More specifically, in the one energy storage apparatus 1, the positive electrode connector 41 and the negative electrode connector 42 are placed in a cable length or a posture that inhibits connection between the positive electrode connector and the negative electrode connector. In the example shown in FIG. 4, at least a part of the portion of the negative electrode power cable 32, the portion extending from the outer case 18, is fixed to the energy storage unit 10. More specifically, in the present embodiment, the metal base member 15 has a fixing portion 15*d* for fixing at least a part of the negative electrode power cable 32. Accordingly, the negative electrode connector 42 is fixed substantially downward (a posture where the opening of the negative electrode connector 42 into which the positive electrode connector 41 is inserted faces downward, and the insertion/removal direction of the positive electrode connector 41 with respect to the negative electrode connector 42 is in the up/down direction; the same applies hereinafter).

In the present embodiment, a part of the negative electrode power cable 32 including the negative electrode connector 42 is fixed to the fixing portion 15*d* formed on the base member 15 with a fixing member 15*g*. More specifically, the fixing member 15*g* is a push mount tie. In the present embodiment, the fixing portion 15*d* is formed by a through hole (a fixing hole 15*i*) provided in the base member 15. That is, as shown in FIG. 4, a part of the fixing member 15*g*, which is a push mount tie, is inserted into the fixing hole 15*i* formed in a fixing piece 15*h* of the base member 15 in an uninsertable manner, thereby firmly fixing the negative electrode power cable 32. For this reason, in order to unfix the negative electrode power cable 32, it is necessary to cause breaking such as cutting or deformation of the fixing member 15*g*. The fixing structure of the fixing portion 15*d* is not particularly limited. For example, a part of the negative electrode power cable 32 may be embedded in a recessed portion (a groove, notch, slit, hole, or the like) provided in the outer case 18 or a recessed portion of a member fixed to the outer case 18 to fix the part of the negative electrode power cable 32. That is, the fixing portion 15*d* may be formed by a recessed portion instead of a hole.

As described above, in a state where the posture of the negative electrode connector 42 is restricted, when the length of the portion of the positive electrode power cable 31 which extends from a corner portion 19 of the outer case 18 is as long as shown in FIG. 4, it is impossible to directly connect the negative electrode connector 42 and the positive electrode connector 41. As described above, the positive electrode connector 41 and the negative electrode connector 42 of the one energy storage apparatus 1 are placed in a state where connection with each other is impossible. That is, for example, as long as there is no breakage, there is no problem of erroneously connecting the positive electrode connector 41 and the negative electrode connector 42 of the one energy storage apparatus 1. In other words, it is possible to substantially prevent erroneous connection between the positive electrode connector 41 and the negative electrode connector 42 which may cause a short circuit of the energy storage apparatus 1 itself.

Since the portion of the positive electrode power cable 31 which extends from the outer case 18 is not restrained, the positive electrode connector 41 can be oriented in any of the upper, lower, left, and right directions. In the present embodiment, the negative electrode connector 42 is fixed substantially downward as shown in FIG. 4. Accordingly, the positive electrode connector 41 can be directly connected to the negative electrode connector 42 of the other energy storage apparatus 1 disposed on the upper side by being brought into an upward posture (a posture where an end portion of the positive electrode connector 41 which is inserted into the negative electrode connector 42 faces upward, and the insertion/removal direction of the positive electrode connector 41 with respect to the negative electrode connector 42 is in the up/down direction; the same applies hereinafter). As described above, the positive electrode power cable 31 and negative electrode power cable 32 are placed at such positions and lengths as to be oriented to opposite sides on the same straight line. Accordingly, the plurality of energy storage apparatuses 1 arranged in a row in the up/down direction can be easily connected in series. More specifically, the positive electrode connector 41 and the negative electrode connector 42 can be always placed in the same straight line. The root portion of the positive electrode connector 41 of the positive electrode power cable 31 and the root portion of the negative electrode connector 42 of the negative electrode power cable 32 can be always placed in the same straight line. Referring to FIG. 4, the positive electrode power cable 31 and the negative electrode power cable 32 are placed at such positions and lengths as to be oriented to opposite sides (the opening of the negative electrode connector 42 faces downward, and the distal end portion of the positive electrode connector 41 faces upward) on a straight line L in the up/down direction (Z-axis direction). More specifically, the positive electrode connector 41 and the negative electrode connector 42 can be arranged on the straight line L toward the opposite sides. The root portion of the positive electrode connector 41 of the positive electrode power cable 31 and the root portion of the negative electrode connector 42 of the negative electrode power cable 32 can be placed in the same straight line L. Accordingly, the plurality of energy storage apparatuses 1 aligned in the up/down direction can be easily connected in series.

More specifically, the positive electrode power cable 31 and the negative electrode power cable 32 both extended from the end portion 18a of the outer case 18 to the outside are extended from the corner portion 19, which is a part of the end portion 18a, to the outside of the outer case 18. That is, in brief, the positive electrode power cable 31 and the negative electrode power cable 32 are in a state of being pulled out from the outer case 18 within a predetermined range centered on one vertex of the rectangular outer case 18. The range of the corner portion 19 of the outer case 18 is exemplified as the range surrounded by the dotted line shown in FIG. 5. The range of the corner portion 19 in FIG. 5 is described as follows.

Figure 5:
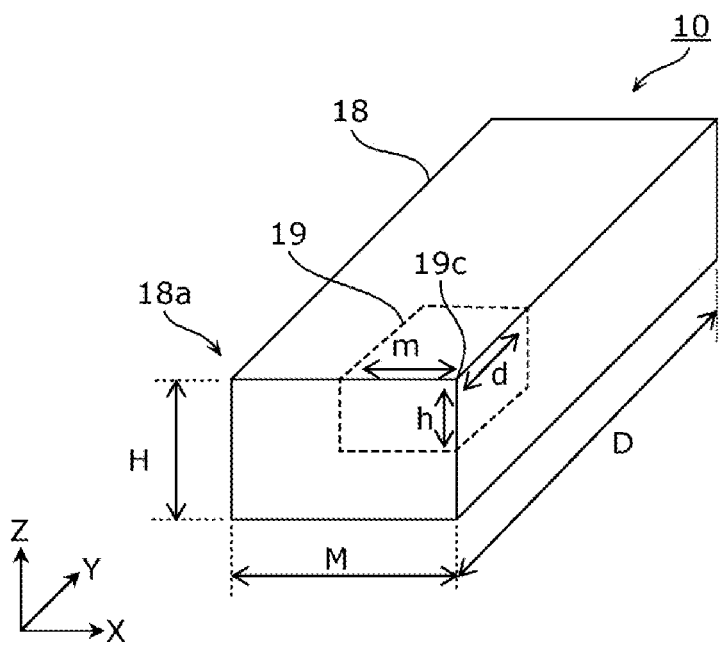
FIG. 5 is a view for explaining an example of the range of a corner portion of the outer case according to the first embodiment.

As shown in FIG. 5, it is assumed that the outer case 18 having a rectangular parallelepiped shape as a whole is disposed such that each side of the outer case 18 extends along the X axis, the Y axis, or the Z axis, and lengths of the sides are D, M, and H (referring to FIG. 5, D>M>H). At this time, a range (a region inside the dotted line in FIG. 5) from one vertex 19c included in the end portion 18a of the outer case 18 in the longitudinal direction (Y-axis direction) to d in the Y-axis direction, m in the X-axis direction, and h in the Z-axis direction is defined as the corner portion 19. The values of d, m, and h are, for example, m=M/2 and h=H/2, and d is, for example, any value of m and h. That is, d may be the same as m, which is a larger value of m and h (d=M/2), or may be the same as h, which is a smaller value of m and h (d=H/2). The range of the corner portion 19 described in this manner is an example, and for example, the corner portion 19 may be a range (within a sphere having the radius h centered on the vertex 19c) up to h the linear distance to which from the vertex 19c is a smaller than the linear distance from the vertex 19c to m. The value d may be set as d=D/2. To further limit the range of the corner portion 19, m=M/N, h=H/N, and h=m or h, and N may be an integer greater than 2. In this case, the outlets of the positive electrode power cable 31 and the negative electrode power cable 32 from the outer case 18 are gathered in a range closer to the vertex 19c.

In the present embodiment, the outlets of the positive electrode power cable 31 and the negative electrode power cable 32 from the outer case 18, that is, the portions placed so as to penetrate through the inside and the outside of the outer case 18, are located approximately on the upper side of the outer case 18 and within the range from the vertex 19c to the distance m.

As described above, in the present embodiment, the outlets of the positive electrode power cable 31 and the negative electrode power cable 32 from outer case 18 are gathered at the corner portion 19.

1-3. Configuration of Energy Storage Equipment

As described above, the energy storage apparatus 1 configured as described above be used as a stationary battery provided in energy storage equipment. The configuration of the energy storage equipment 100 according to the present embodiment will be described below with reference to FIGS. 6 and 7.

Figure 6:
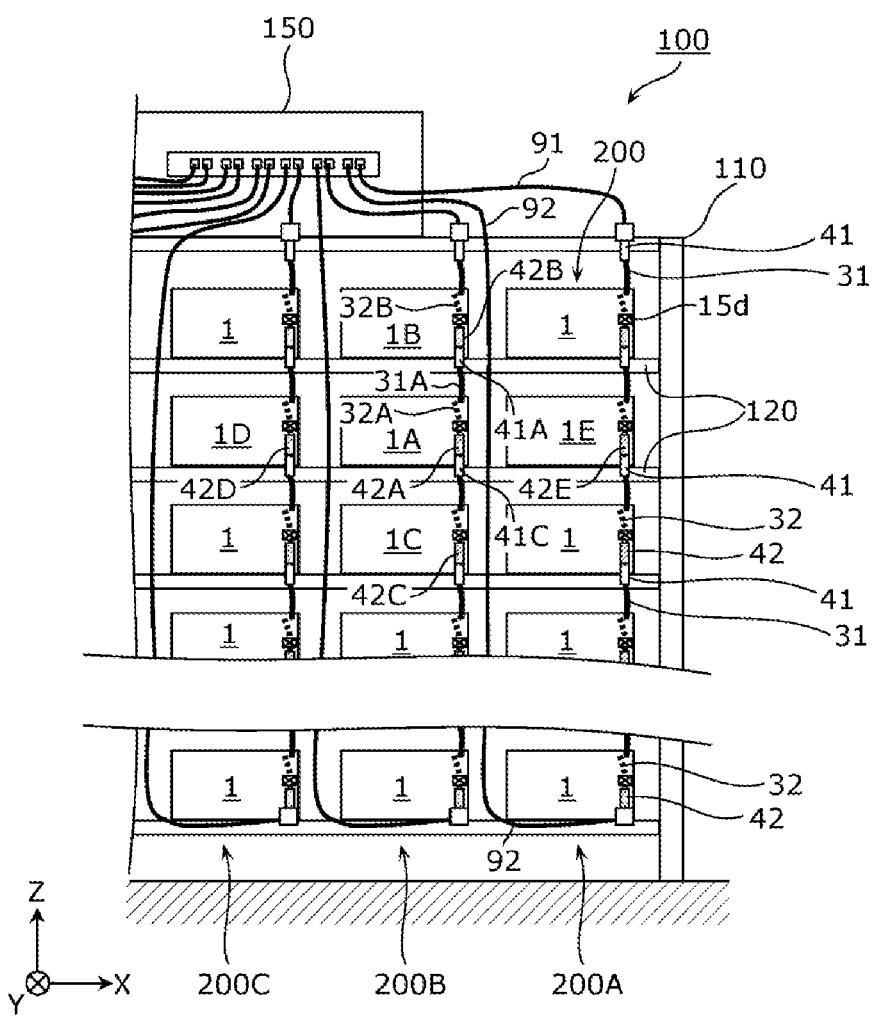
FIG. 6 is a partial front view showing a configuration outline of energy storage equipment according to the first embodiment.
Figure 7:
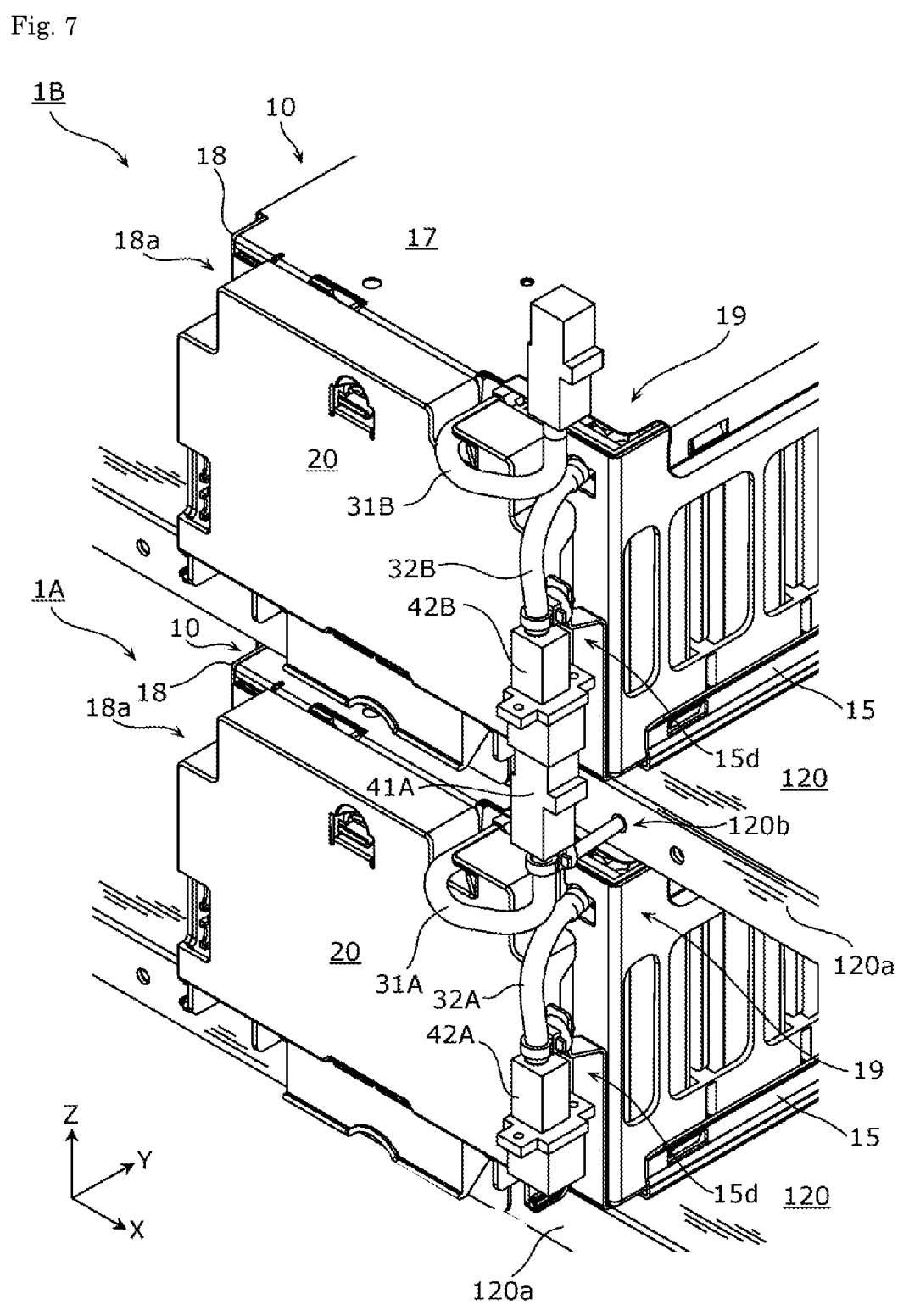

FIG. 6 is a partial front view showing a configuration outline of the energy storage equipment 100 according to the first embodiment. FIG. 6 simply shows each of the plurality of energy storage apparatuses 1 with, for example, the illustration of the board unit 20 being omitted and the fixing portion 15d being schematically shown. The positive electrode power cable 31 is shown by the thick solid line, and the negative electrode power cable 32 is shown by the thick dotted line. These supplementary items also apply to FIGS. 8 and 9 described later. FIG. 7 is an enlarged perspective view showing an aspect of the electrical connection between the two energy storage apparatuses 1 in the energy storage equipment 100 according to the embodiment. Referring to FIG. 7, only the two energy storage apparatuses 1 arranged vertically and a shelf plate 120 between them are focused on, and the illustration of the other energy storage apparatuses 1 and the like is omitted.

As shown in FIG. 6, the energy storage equipment 100 includes the plurality of energy storage apparatuses 1, a rack 110 accommodating the plurality of energy storage apparatuses 1, and an electric circuit unit 150 connected to the plurality of energy storage apparatuses 1. Each of the racks 110 has a plurality of shelf plates 120 on which one or more energy storage apparatuses 1 can be mounted. The plurality of shelf plates 120 are placed side by side in the up/down direction. In the rack 110 configured as described above, the plurality of energy storage apparatuses 1 mounted on the plurality of shelf plates 120 are arranged in a straight line along the up/down direction. That is, in the rack 110, a plurality of rows (energy storage apparatus arrays 200) of the energy storage apparatuses 1 in the up/down direction (longitudinal direction) are formed in the left/right direction. Referring to FIG. 6, in order to distinguish the plurality of energy storage apparatus arrays arranged in the left/right direction from each other, different reference numerals (200A, 200B, and 200C) are given to the plurality of energy storage apparatus arrays 200.

With such a configuration, the energy storage apparatus 1 according to the present embodiment can be efficiently and easily electrically connected to at least one of the energy storage apparatuses 1 arranged immediately above and immediately below the energy storage apparatus 1. More specifically, when focusing on one energy storage apparatus 1, as described above, as shown in FIG. 7, the negative electrode connector 42 and the positive electrode connector 41 can be in mutually opposite postures on a straight line in the up/down direction. With such a configuration, as shown in FIG. 6, in each of the plurality of energy storage apparatus arrays 200, the plurality of energy storage apparatuses 1 can be connected in series. The positive electrode connector 41 of the uppermost energy storage apparatus 1 in each of the plurality of energy storage apparatus arrays 200 is connected to the electric circuit unit 150 via the connection cable 91, and the negative electrode connector 42 of the lowermost energy storage apparatus 1 is connected to the electric circuit unit 150 via the connection cable 92.

The plurality of energy storage apparatus arrays 200 are formed in the left/right direction, and the electric circuit unit 150 electrically connects the energy storage apparatus arrays 200 adjacent to each other in the left/right direction in series. For example, the energy storage apparatus arrays 200 A, 200 B, and 200 C are connected in series in this order. Accordingly, all the energy storage apparatuses 1 accommodated in the rack 110 are electrically connected in series. That is, in the plurality of energy storage apparatuses 1 arranged vertically and horizontally (up/down and left/right) by being accommodated in the rack 110, the series connection in the longitudinal direction is made by the connection between the positive electrode connector 41 and the negative electrode connector 42 of the two energy storage apparatuses 1 adjacent vertically. In the plurality of energy storage apparatuses 1 arranged vertically and horizontally, the series connection of the energy storage apparatus arrays 200 in the left/right direction is performed by the electric circuit unit 150 electrically interposed between the energy storage apparatus arrays 200 adjacent to each other in the left/right direction. The series connection between the energy storage apparatus arrays 200 may be made not by the electric circuit unit 150 but by an intermediate cable connecting the energy storage apparatus arrays 200 adjacent to each other in the left/right direction.

Instead of connecting all the energy storage apparatus arrays 200 in series, the energy storage apparatus arrays 200 may be connected in parallel. Some (two or more) energy storage apparatus arrays 200 among the plurality of energy storage apparatus arrays 200 may be connected in series to form an energy storage apparatus group as a unit. Similarly, a plurality of energy storage apparatus groups may be configured to connect the respective energy storage apparatus groups in parallel.

The electric circuit unit 150 accommodates, for example, wiring cables for connecting the energy storage apparatus arrays 200 in series, wiring breakers (circuit breakers), a control circuit, and the like. The circuit breaker is disposed on a main circuit through which a main current for charging and discharging each energy storage apparatus 1 flows, and the control circuit is connected to the board unit 20 of each energy storage apparatus 1 via a signal line (not shown). The electric circuit unit 150 can control charging and discharging of the plurality of energy storage apparatuses 1 for each energy storage apparatus array 200.

In the energy storage equipment 100 having such a configuration, when attention is paid to whether or not one energy storage apparatus 1 can be connected to the four energy storage apparatuses 1 on the upper, lower, left, and right sides the one energy storage apparatus 1, the one energy storage apparatus 1 can be connected only to the upper and lower energy storage apparatuses 1. More specifically, the above case will be described as follows when the energy storage apparatus 1 located at the substantially center in FIG. 6 is denoted as an energy storage apparatus 1A, and the four energy storage apparatuses 1 on the upper, lower, left, and right sides of the energy storage apparatus 1 are denoted as energy storage apparatuses 1B, 1C, 1D, and 1E, and the power cables and the connectors are also denoted by reference signs A to B for distinction. The energy storage apparatus 1A is an example of the first energy storage apparatus, and the energy storage apparatus 1B is an example of the second energy storage apparatus.

A negative electrode power cable 32 A of the energy storage apparatus 1A is fixed with a fixing portion 15d (see FIG. 7) of the energy storage unit 10 of the energy storage apparatus 1A such that a negative electrode connector 42A is oriented downward (an opening for connection with a positive electrode connector 41C is oriented downward). The length of a positive electrode power cable 31A of the energy storage apparatus 1A is such a length that a positive electrode connector 41A cannot be connected to the negative electrode connector 42A in a state where the negative electrode power cable 32A is fixed with the fixing portion 15d.

In each of the energy storage apparatuses 1B to 1E on the upper, lower, left, and right sides of the energy storage apparatus 1A, negative electrode connectors 42B to 42E are oriented downward. In this state, the positive electrode power cable 31A of the energy storage apparatus 1A is not long enough to connect the positive electrode connector 41A to the negative electrode connectors 42C, 42D, and 42E of the immediately below, left, and right energy storage apparatuses 1C, 1D, and 1E. However, the negative electrode connector 42B of the energy storage apparatus 1B immediately above the energy storage apparatus 1A is disposed in a downward posture, that is, facing the side where the positive electrode connector 41A exists. With such a configuration, as shown in FIGS. 6 and 7, the positive electrode connector 41A of the positive electrode power cable 31A of the energy storage apparatus 1A can be directly connected to the negative electrode connector 42B of the negative electrode power cable 32B of the energy storage apparatus 1B without difficulty. In FIG. 6, the four energy storage apparatuses 1 obliquely above and obliquely below the energy storage apparatus 1A are located farther from the positive electrode connector 41A as compared with the energy storage apparatuses 1B to 1E on the upper, lower, left, and right sides. Accordingly, it is impossible to connect each of the negative electrode connectors 42 to the positive electrode connector 41A.

As described above, in the present embodiment, in the plurality of energy storage apparatuses 1 arranged vertically and horizontally, direct connection can be made only between the energy storage apparatuses 1 vertically adjacent to each other.

When focusing on the positions of the positive electrode connector 41 and the negative electrode connector 42 in the front/rear direction, first, as shown in FIG. 7, each energy storage apparatus 1 is disposed in a posture where the end portion 18a of the outer case 18 faces the front surface side (the Y-axis minus direction side) of the rack 110. The positions of the positive electrode connector 41 and the negative electrode connector 42 in the front/rear direction are positions at or near a front end surface 120a of the shelf plate 120.

In the example shown in FIG. 7, the positive electrode connector 41A and the negative electrode connector 42A of the energy storage apparatus 1A are positioned in front of the front end surface 120a of the shelf plate 120. Accordingly, when the positive electrode connector 41A is connected to the negative electrode connector 42B, the shelf plate 120 on the energy storage apparatus 1A does not become an obstacle. Similarly, when the positive electrode connector 41C (see FIG. 6) is connected to the negative electrode connector 42A, the shelf plate 120 under the energy storage apparatus 1A does not become an obstacle. The positions of the plurality of shelf plates 120 in the front/rear direction which are arranged in the up/down direction are the same, and the positions of the front end surfaces 120a in the front/rear direction are also the same.

In the example shown in FIG. 7, the positive electrode power cable 31 having the positive electrode connector 41 is also fixed such that the positive electrode connector 41 takes a predetermined posture. More specifically, a part of the positive electrode power cable 31A of the energy storage apparatus 1A is fixed to the front end surface 120a of the shelf plate 120. In the present embodiment, a through hole provided in the front end surface 120a of the shelf plate 120 functions as a fixing portion 120b. Fixing with the fixing portion 120b can be implemented by using a push mount tie as a fixing member similarly to the fixing portion 15d. In the example shown in FIG. 7, the positive electrode power cable 31A is fixed by inserting a push mount tie for binding the positive electrode power cable 31A into the hole (the fixing portion 120*b*) of the front end surface 120*a* of the shelf plate 120 on the energy storage apparatus 1A. As a result, the positive electrode connector 41A is fixed in a posture facing upward, that is, in a posture facing the negative electrode connector 42B which is a connection partner. As a result, bending stress generated by bending of the positive electrode power cable 31A can be absorbed or alleviated by the fixing portion 120*b* and the push mount tie. As a result, even when the positive electrode power cable 31A is relatively hard, the possibility that the bending stress of the positive electrode power cable 31A obstructs the electrical and mechanical connection between the positive electrode connector 41A and the negative electrode connector 42B is reduced. Similarly to the fixing portion 15*d*, the fixing structure of the fixing portion 120*b* is not particularly limited. At the time of maintenance or the like of the energy storage apparatus 1, it is necessary to remove the positive electrode connector 41 and the negative electrode connector 42. For this reason, the size of the through hole which is the fixing portion 120*b* is set such that the positive electrode power cable 31 can be detachably fixed.

The fixing portion 120*b* provided on the front end surface of the shelf plate 120 can also be used for fixing the connection cable 92 (see FIG. 6). That is, by inserting the push mount tie as the fixing member attached to the connection cable 92 into the fixing portion 120 *b*, the portion of the connection cable 92 which is located on the front surface of the rack 110 can be fixed to the rack 110.

1-4. First Modification Example

As described above, in the present embodiment, in the energy storage apparatus 1, the positive electrode power cable 31 and the negative electrode power cable 32 are placed at such positions and lengths as to allow one of the positive electrode connector 41 and the negative electrode connector 42 to be oriented to a side opposite to the other on a straight line in the up/down direction. However, the direction in which the positive electrode connector 41 and the negative electrode connector 42 are arranged is not limited to the up/down direction. Accordingly, a case where the direction in which the positive electrode connector 41 and the negative electrode connector 42 are arranged is the left/right direction will be described as the first modification example of the first embodiment, focusing on the difference from the above embodiment.

Figure 8:
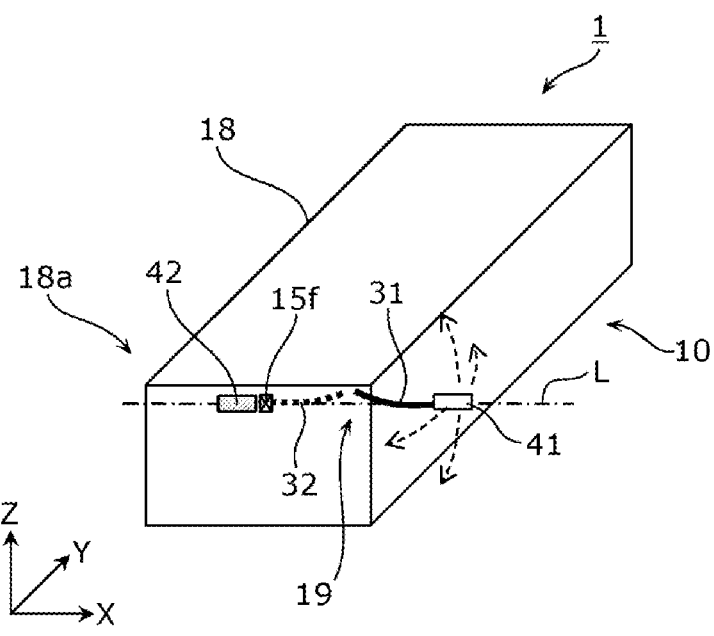
FIG. 8 is a schematic view showing a placement example of a positive electrode power cable and a negative electrode power cable of the energy storage apparatus according to the first modification example of the first embodiment.

FIG. 8 is a schematic view showing a placement example of the positive electrode power cable 31 and the negative electrode power cable 32 of the energy storage apparatus 1 according to the first modification example of the embodiment. FIG. 9 is a partial front view showing a configuration outline of the energy storage equipment 100 according to the first modification example of the embodiment. Referring to FIG. 9, the three energy storage apparatuses 1 are respectively referred to as energy storage apparatuses 1F, 1G, and 1H in order to distinguish the three energy storage apparatuses 1 from each other. The energy storage apparatus 1F is an example of the first energy storage apparatus, and the energy storage apparatus 1H is an example of the second energy storage apparatus. Referring to FIG. 9, in order to distinguish two energy storage apparatus arrays which are arrays of the plurality of energy storage apparatuses 1 (energy storage apparatus arrays) arranged in the left/right direction and in the up/down direction, different reference numerals (200D and 200E) are given to the respective energy storage apparatus arrays.

The energy storage apparatus 1 according to this modification example has the same basic structure as the energy storage apparatus 1 according to the first embodiment. That is, the energy storage apparatus 1 according to this modification example includes the board unit 20 (not shown in FIG. 8 and FIG. 9), and a plurality of energy storage devices 11 are housed inside the outer case 18. In the inside of the outer case 18, total plus terminals (the positive electrode connection terminals 51 of the energy storage unit 10) of the plurality of energy storage devices 11 and the positive electrode power cable 31 are connected to each other, and total negative terminals (the negative electrode connection terminals 52 of the energy storage unit 10) of the plurality of energy storage devices 11 and the negative electrode power cable 32 are connected to each other. Both the positive electrode power cable 31 and the negative electrode power cable 32 extend from the corner portion 19 at the end portion 18*a* of the outer case 18 to the outside.

However, as shown in FIG. 8, a part of the negative electrode power cable 32 according to the present modification example is fixed with a fixing portion 15*f* such that the negative electrode connector 42 is oriented leftward. In this case, the positive electrode power cable 31 is not positioned and long enough to connect the positive electrode connector 41 to the negative electrode connector 42. That is, since a part of the negative electrode power cable 32 is fixed with the fixing portion 15*f*, the negative electrode connector 42 and the positive electrode connector 41 are placed in an unconnectable posture.

However, since the positive electrode power cable 31 of the energy storage apparatus 1 is not fixed, the positive electrode connector 41 can be oriented in various directions. That is, as shown in FIG. 8, the positive electrode power cable 31 and the negative electrode power cable 32 are placed at such positions and lengths as to allow one of the positive electrode connector 41 and the negative electrode connector 42 to be oriented to a side opposite to the other on the straight line L in the left/right direction. When the energy storage apparatus 1 having the above configuration is used in the energy storage equipment 100 according to this modification example shown in FIG. 9, the negative electrode connector 42 of one of the two energy storage apparatuses 1 arranged adjacent to each other in the left/right direction (X-axis direction) can be directly connected to the positive electrode connector 41 of the other energy storage apparatus 1 without difficulty and erroneous connection.

The negative electrode connector 42 of the energy storage apparatus 1F can be connected only to the positive electrode connector 41 of the energy storage apparatus 1G adjacent to the energy storage apparatus 1F on the left when viewed from the front. The positive electrode connector 41 of the energy storage apparatus 1F can be connected only to the negative electrode connector 42 of the energy storage apparatus 1H adjacent to the energy storage apparatus 1F on the right when viewed from the front. Accordingly, the plurality of energy storage apparatuses 1 arranged in the left/right direction can be easily or efficiently connected in series. In the energy storage equipment 100 according to the present modification example, the energy storage apparatuses 1 at the left and right end portions in the row of the energy storage apparatuses 1 in the left/right direction are connected to the electric circuit unit 150 (not shown) via the connection cable 91 (not shown) or the connection cable 92. With such a configuration, the electric circuit unit 150 can control charging and discharging of the plurality of energy storage apparatuses 1 for each of the energy storage apparatus arrays (200D and 200E) arranged in the up/down direction, for example.

1-5. Second Modification Example

In the energy storage apparatus 1 according to the first embodiment described above, both the positive electrode power cable 31 and the negative electrode power cable 32 extend from the corner portion 19 at the end portion 18*a* of the outer case 18 to the outside. However, the positive electrode power cable 31 and the negative electrode power cable 32 may extend from different corner portions 19 of the outer case 18 to the outside. Therefore, a case where the positive electrode power cable 31 and the negative electrode power cable 32 extend from mutually different corner portions 19 will be described as the second modification example of the first embodiment, focusing on a difference from the first embodiment.

Figure 10:
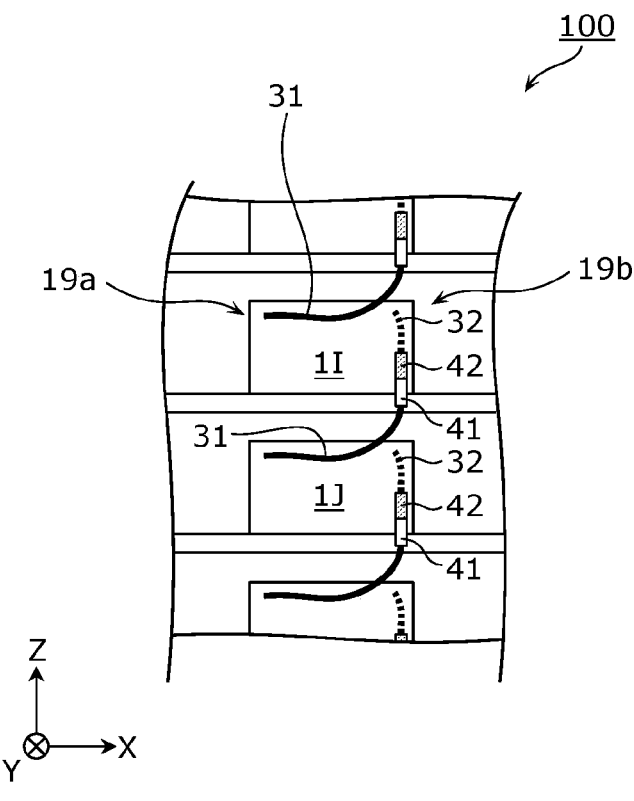
FIG. 10 is a schematic view showing a placement example of a positive electrode power cable and a negative electrode power cable of an energy storage apparatus according to the second modification example of the first embodiment.

FIG. 10 is a schematic view showing a placement example of the positive electrode power cable 31 and the negative electrode power cable 32 of the energy storage apparatus 1 according to the second modification example of the first embodiment. Referring to FIG. 10, the two energy storage apparatuses 1 are respectively referred to as energy storage apparatuses 1I and 1J in order to distinguish the two energy storage apparatuses 1 from each other. The energy storage apparatus 1I is an example of the first energy storage apparatus, and the energy storage apparatus 1J is an example of the second energy storage apparatus. In order to distinguish the two corner portions 19 at the upper portion of the end portion 18*a* of the energy storage apparatus 1 from each other, reference numerals (19*a* and 19*b*) different from each other are given to the corner portions.

The energy storage apparatus 1 according to this modification example has the same basic structure as the energy storage apparatus 1 according to the first embodiment. That is, the energy storage apparatus 1 according to this modification example includes the board unit 20 (not shown in FIG. 10), and a plurality of energy storage devices 11 are housed inside the outer case 18. In the inside of the outer case 18, total plus terminals (the positive electrode connection terminals 51 of the energy storage unit 10) of the plurality of energy storage devices 11 and the positive electrode power cable 31 are connected to each other, and total negative terminals (the negative electrode connection terminals 52 of the energy storage unit 10) of the plurality of energy storage devices 11 and the negative electrode power cable 32 are connected to each other. Both the positive electrode power cable 31 and the negative electrode power cable 32 extend from the end portion 18*a* of the outer case 18 to the outside.

However, according to the present modification example, as shown in FIG. 10, the positive electrode power cable 31 extends from the corner portion 19*a* to the outside, and the negative electrode power cable 32 extends from the corner 19*b* to the outside. That is, the positive electrode power cable 31 and the negative electrode power cable 32 extend from the different corner portions 19. Further, the negative electrode power cable 32 is fixed to the energy storage unit 10 with a fixing portion (not shown). Accordingly, the negative electrode connector 42 and the positive electrode connector 41 are placed in a state where they cannot be connected to each other.

In this case, since the positive electrode power cable 31 of the energy storage apparatus 1 is not fixed, the positive electrode connector 41 can be oriented in various directions.

That is, as shown in FIG. 10, the positive electrode power cable 31 and the negative electrode power cable 32 of the one energy storage apparatus 1 are placed at such positions as to allow one of the positive electrode connector 41 and the negative electrode connector 42 to be oriented to a side opposite the other on the straight line in the up/down direction. When the energy storage apparatus 1 having the above configuration is used in the energy storage equipment 100 according to this modification example shown in FIG. 10, the negative electrode connector 42 of one of the two energy storage apparatuses 1 arranged adjacent to each other in the up/down direction (Z-axis direction) can be directly connected to the positive electrode connector 41 of the other energy storage apparatus 1 without difficulty.

1-6. Description of Effects

The energy storage apparatus 1 according to the first embodiment (including its modification example) includes the energy storage unit 10 including the plurality of energy storage devices 11, the negative electrode power cable 32, and the positive electrode power cable 31. The negative electrode power cable 32 is connected to the negative electrode connection terminal 52 of the energy storage unit 10 and extends from the end portion 18*a* of the energy storage unit 10 to the outside of the energy storage unit 10. The positive electrode power cable 31 is connected to the positive electrode connection terminal 51 of the energy storage unit 10 and extends from the end portion 18*a* of the energy storage unit 10 to the outside of the energy storage unit 10. The negative electrode power cable 32 includes the negative electrode connector 42. The positive electrode power cable 31 includes the positive electrode connector 41 including a structure that allows direction connection with the negative electrode connector 42. The negative electrode power cable 32 is placed in a length or a posture that inhibits connection between the negative electrode connector 42 and the positive electrode connector 41.

As described above, in the energy storage apparatus 1 according to the first embodiment, since the negative electrode connector 42 includes a structure that allows direct connection with the positive electrode connector 41, the energy storage equipment 100 having a large output voltage as a whole can be configured by arranging the plurality of the energy storage apparatuses 1. Since the negative electrode connector 42 and the positive electrode connector 41 of the one energy storage apparatus 1 are provided in a physically unconnectable state, a short circuit due to erroneous connection between the negative electrode connector 42 and the positive electrode connector 41 of the one energy storage apparatus 1 does not occur. As described above, the energy storage apparatus 1 according to the present embodiment is an energy storage apparatus with improved safety. By adjusting the length instead of the posture of the negative electrode power cable 32 or by adjusting the posture and the length of the negative electrode power cable 32, it is also possible to make it impossible to connect the negative electrode connector 42 and the positive electrode connector 41.

Since the portion of the negative electrode power cable 32 which extends from the energy storage unit 10 is fixed to the energy storage unit 10, the negative electrode power cable 32 is disposed in a posture that inhibits connection between the negative electrode connector 42 and the positive electrode connector 41.

According to this configuration, for example, the negative electrode connector 42 in the negative electrode power cable 32 is fixed. Alternatively, the cable portion of the negative electrode power cable 32 which is located near the negative electrode connector 42 is fixed. This can prevent erroneous connection between the negative electrode connector 42 and the positive electrode connector 41 of the energy storage apparatus 1 and can fix the negative electrode power cable 32 in a direction suitable for connection with another energy storage apparatus 1.

More specifically, in the present embodiment, as shown in FIGS. 1 and 4 and the like, the negative electrode power cable 32 extending from the end portion 18a of the energy storage unit 10 is fixed at a position on the inner side (the side of the energy storage unit 10) with respect to the end surface of the board unit 20 disposed at the end portion 18a in the extending direction (Y-axis minus direction). That is, since the position of the negative electrode power cable 32 extracted from the energy storage unit 10 is at the end portion 18a of the energy storage unit 10 and on a side of the board unit 20, the negative electrode power cable 32 can be bent and disposed so as not to protrude from the outer shape of the energy storage apparatus 1. Accordingly, the energy storage apparatus 1 can be made compact.

The energy storage unit 10 includes a plate-like base member 15 which supports the plurality of energy storage devices 11. The base member 15 includes the fixing portion 15d for fixing the negative electrode power cable 32.

As described above, since the fixing portion 15d is provided on the base member 15 made of a metal such as iron, the negative electrode power cable 32 can be firmly or reliably fixed. As a result, the negative electrode connector 42 is more reliably maintained in a predetermined posture.

The negative electrode connector 42 is disposed in a posture in a direction opposite to the insertion direction of the positive electrode connector 41 into the negative electrode connector 42 of another energy storage apparatus 1 when the positive electrode connector 41 is connected to the negative electrode connector 42 of another energy storage apparatus 1.

With such a configuration, one energy storage apparatus 1 (the first energy storage apparatus) and the two other energy storage apparatuses 1 (the second energy storage apparatus and the third energy storage apparatus) which sandwich the one energy storage apparatus 1 between them can be arranged in a row, and these energy storage apparatuses 1 can be electrically connected in series to each other. More specifically, in the first embodiment, as shown in FIG. 6, in the energy storage apparatus 1A (the first energy storage apparatus), the positive electrode connector 41A is connected to the negative electrode connector 42B of the energy storage apparatus 1B (the second energy storage apparatus), and the negative electrode connector 42 A is disposed in a downward posture. The negative electrode connector 42A is connected to the positive electrode connector 41C of the lower energy storage apparatus 1C (the third energy storage apparatus). In this state, the insertion direction (downward direction) of the negative electrode connector 42A of the energy storage apparatus 1A into the positive electrode connector 41C of the energy storage apparatus 1C is opposite to the insertion direction (upward direction) of the positive electrode connector 41A of the energy storage apparatus 1A into the negative electrode connector 42B of the energy storage apparatus 1B. With such a configuration, the plurality of energy storage apparatuses 1 arranged in a row in the up/down direction are connected in series. In the modification, as shown in FIG. 9, the positive electrode connector 41 of the energy storage apparatus 1F (the first energy storage apparatus) is connected to the negative electrode connector 42 of the right energy storage apparatus 1H (the second energy storage apparatus), and the negative electrode connector 42 of the energy storage apparatus 1F is disposed in a leftward posture. The negative electrode connector 42A of the energy storage apparatus 1F is connected to the positive electrode connector 41 of the left energy storage apparatus 1G (the third energy storage apparatus). In this state, the insertion direction (left direction) of the negative electrode connector 42 of the energy storage apparatus 1F into the positive electrode connector 41 of the energy storage apparatus 1G is opposite to the insertion direction (right direction) of the positive electrode connector 41 of the energy storage apparatus 1F into the negative electrode connector 42 of the energy storage apparatus 1H. With such a configuration, the plurality of energy storage apparatuses 1 arranged in a row in the left/right direction are connected in series.

As shown in FIG. 2, the energy storage apparatus 1 includes the board unit 20 including the board 25 electrically connected to the energy storage unit 10. The board unit 20 is disposed at the end portion 18a of the energy storage unit 10.

As described above, the board unit 20 is disposed at the end portion 18a of the energy storage unit 10 from which the negative electrode power cable 32 and the positive electrode power cable 31 are extracted. Therefore, by disposing the energy storage apparatus 1 such that the end portion 18a of the energy storage unit 10 faces the passage side where the worker moves back and forth, it is possible to facilitate maintenance of the board unit 20 or the board 25 or connection work between the negative electrode connector 42 and the positive electrode connector 41.

The energy storage equipment 100 according to the first embodiment (including its modification example) includes the plurality of energy storage apparatuses 1. Each of the plurality of energy storage apparatuses 1 includes the energy storage unit 10 including the plurality of energy storage devices 11 and the outer case 18 holding the plurality of energy storage devices 11, the positive electrode power cable 31, and the negative electrode power cable 32. The positive electrode power cable 31 is connected to the positive electrode connection terminal 51 of the energy storage unit 10 inside the outer case 18 and extends from the end portion 18a of the outer case 18 toward the outside of the outer case 18. The negative electrode power cable 32 is connected to the negative electrode connection terminal 52 of the energy storage unit 10 inside the outer case 18 and extends from the end portion 18a of the outer case 18 toward the outside of the outer case 18. The positive electrode power cable 31 includes the positive electrode connector 41, and the negative electrode power cable 32 includes the negative electrode connector 42 separate from the positive electrode connector 41. The positive electrode connector 41 of one energy storage apparatus 1 of the two energy storage apparatuses 1 adjacent to each other of the plurality of energy storage apparatuses 1 is directly connected to the negative electrode connector 42 of the other energy storage apparatus 1 of the two energy storage apparatuses 1.

As described above, in the present embodiment, in the plurality of energy storage apparatuses 1 arranged in a row, one positive electrode connector 41 and the other negative electrode connector 42 of the two adjacent energy storage apparatuses 1 are connected to each other, thereby connecting the two energy storage apparatuses 1 to each other. That is, the two energy storage apparatuses 1 are electrically connected by one connecting operation (at one portion). Since the positive electrode connector 41 and the negative electrode connector 42 are separate components, the positive electrode connector and the negative electrode connector can be oriented in different directions from each other. Accordingly, the energy storage apparatus 1 can be connected in series to the energy storage apparatuses 1 on both sides (up and down, left and right, or the like) in the alignment direction of the energy storage apparatuses 1. As described above, each energy storage apparatus 1 includes the power cables (31 and 32) with the connectors for the positive electrode and the negative electrode. Therefore, it is possible to easily connect the two energy storage apparatuses 1 to be connected to each other without separately using a conductive member such as a cable for connecting the energy storage apparatuses 1 to each other and without using a tool such as a wrench. As described above, according to the energy storage equipment 100 according to the first embodiment, a connecting operation for the plurality of energy storage apparatuses 1 can be easily performed.

In the process of manufacturing the plurality of energy storage apparatuses 1, a connecting operation (such as fastening of nuts) is performed to connect the positive electrode power cable 31 and the negative electrode power cable 32 to the energy storage unit 10. This improves the reliability or the quality of the connection between the positive electrode power cable 31 and the negative electrode power cable 32 and the energy storage unit 10 and also improves the reliability or homogenizes the quality among the plurality of energy storage apparatuses 1.

The plurality of energy storage apparatuses 1 are placed side by side in at least one direction out of the up/down direction and the left/right direction in a posture where the end portions 18a from which the positive electrode power cable 31 and the negative electrode power cable 32 are extracted, which are the end portions 18a of the outer cases 18 which the plurality of energy storage apparatuses 1 respectively include, are oriented in the same direction (the first direction). In the first embodiment, as shown in FIGS. 6, 7, and 9, the plurality of energy storage apparatuses 1 are placed side by side in the up/down direction and the left/right direction in a posture where the end portions 18a of the respective outer cases 18 face the front surface (the front side of the rack 110). With regard to the positive electrode power cable 31A of one energy storage apparatus 1 (for example, the energy storage apparatus 1A shown in FIGS. 6 and 7), the positive electrode connector 41A can be connected to the negative electrode connector 42B of the energy storage apparatus 1B and cannot be connected to the negative electrode connector 42 of each of one or more energy storage apparatuses 1 other than the energy storage apparatus 1B (including the energy storage apparatus 1A). In the present embodiment, the direction in which rack 110 faces (direction in which the front end surface 120a of the shelf plate 120 faces and the Y-axis minus direction) is the first direction. The plurality of energy storage apparatuses 1 are placed side by side in the up/down direction (Z-axis direction) which is the second direction intersecting with the first direction. The second direction intersecting the first direction may be the left/right direction (X-axis direction). In this case, the plurality of energy storage apparatuses 1 are placed side by side in the left/right direction (X-axis direction).

According to this configuration, the positive electrode connector 41 provided for the positive electrode power cable 31 of one energy storage apparatus 1 cannot be physically connected to the negative electrode connector 42 which is prohibited from being connected. Therefore, when a large number of energy storage apparatuses 1 which are identical products are arranged side by side vertically and horizontally, the positive electrode connector 41 and the negative electrode connector 42 of an incorrect combination are not connected to each other, and the positive electrode connector 41 and the negative electrode connector 42 of the one energy storage apparatus 1 are not connected to each other (no short circuit occurs in the energy storage apparatus 1). That is, a connecting operation for the plurality of energy storage apparatuses 1 can be easily and accurately performed. The positive electrode connector 41A can be selectively changed between a connectable connector and an unconnectable connector by changing the length of the positive electrode power cable 31A.

The positive electrode power cable 31 and the negative electrode power cable 32 extend from the corner portion 19 of the rectangular outer case 18, which is a part of the end portion 18a of the outer case 18, to the outside of the outer case 18.

As described above, in the energy storage apparatus 1, the outlets of the two power cables (31 and 32) for the positive electrode and the negative electrode from the outer case 18 are gathered at the corner portion 19 of the outer case 18. Therefore, even when the energy storage apparatus 1 of the connection partner is any of the upper, lower, left, and right energy storage apparatuses, the positive electrode power cable 31 and the negative electrode power cable 32 are placed in a posture along the up/down direction or the left/right direction (see FIGS. 6 and 9). That is, when the adjacent energy storage apparatuses 1 are connected in series, the positive electrode power cable 31 and the negative electrode power cable 32 are not placed obliquely with respect to the up/down direction or the left/right direction. Therefore, the lengths of the positive electrode power cable 31 and the negative electrode power cable 32 may be relatively short, and the wire connection work between the positive electrode power cable 31 and the negative electrode power cable 32 (the connecting operation between the positive electrode connector 41 and the negative electrode connector 42) is easy.

In each of the plurality of energy storage apparatuses 1, the positive electrode power cable 31 and the negative electrode power cable 32 are placed at positions where one of the positive electrode connector 41 and the negative electrode connector 42 can be oriented to a side opposite to the other on the same straight line.

According to this configuration, the positive electrode connector 41 and the negative electrode connector 42 of one energy storage apparatus 1 are arranged in opposite directions and on a straight line. Therefore, when the plurality of energy storage apparatuses 1 are arranged in a direction parallel to the straight line, the positive electrode connector 41 of one of the two adjacent energy storage apparatuses 1 and the negative electrode connector 42 of the other energy storage apparatus 1 are in postures facing each other coaxially. Therefore, the plurality of energy storage apparatuses 1 can be easily connected in series. That is, in the above first embodiment, the positive electrode connector 41 and the negative electrode connector 42 of the one energy storage apparatus 1 are arranged on the straight line L in the up/down direction in opposite directions to each other (see FIG. 4). Therefore, as shown in FIG. 6, the plurality of energy storage apparatuses 1 aligned regularly in the up/down direction can be easily connected in series. In the above modification example, the positive electrode connector 41 and the negative electrode connector 42 of the one energy storage apparatus 1 are arranged on the straight line L in the left/right direction in opposite directions to each other (see FIG. 7). Therefore, as shown in FIG. 9, the plurality of energy storage apparatuses 1 aligned regularly in the left/right direction can be easily connected in series. Whether or not one of the positive electrode connector 41 and the negative electrode connector 42 can be oriented on the same straight line to the side opposite to the other may be related not only to the positions of the positive electrode power cable 31 and the negative electrode power cable 32 but also to their lengths. That is, the positive electrode power cable 31 and the negative electrode power cable 32 may be placed at such positions and lengths as to allow one of the positive electrode connector 41 and the negative electrode connector 42 to be oriented to a side opposite to the other on the same straight line.

The energy storage equipment 100 includes the rack 110 including one or more shelf plates 120 on which the plurality of energy storage apparatuses 1 are mounted. Each of the plurality of energy storage apparatuses 1 is disposed in a posture where the end portion 18a of the outer case 18 faces the front surface side of the rack 110. The positive electrode connector 41 and the negative electrode connector 42 are placed in the front/rear direction so as to be positioned at or near the front end surface 120a of the shelf plate 120.

According to this configuration, the positive electrode connector 41 and the negative electrode connector 42 of the combination to be connected are placed at or near the front end surface 120a of the rack 110. Accordingly, after the plurality of energy storage apparatuses 1 are mounted on the plurality of shelf plates 120 of the rack 110, it is easy to perform the operation of connecting the positive electrode connector 41 and the negative electrode connector 42 of one of the two energy storage apparatuses 1 vertically adjacent to each other. More preferably, the positions of the positive electrode connector 41 and the negative electrode connector 42 in the front/rear direction are the same as or in front of the front end surface 120a of the shelf plate 120 positioned between the two energy storage apparatuses 1. In this case, as shown in FIG. 7, the positive electrode power cable 31 including the positive electrode connector 41 is disposed at a position exceeding the shelf plate 120 in the up/down direction but is disposed at a position not substantially interfering with the shelf plate 120. The negative electrode connector 42 is located immediately above the positive electrode connector 41 facing upward. This can almost eliminate the possibility that the connection work between the positive electrode connector 41 and the negative electrode connector 42 is hindered by the shelf plate 120.

In the energy storage equipment 100, at least a part of the portion of the negative electrode power cable 32 which extends from the energy storage unit 10 is fixed to the energy storage unit 10, and a part of the portion of the positive electrode power cable 31 which extends from the energy storage unit 10 is not fixed to the energy storage unit 10.

As described above, the negative electrode power cable 32 extracted from one energy storage apparatus 1 is fixed to the energy storage apparatus 1, and the positive electrode power cable 31 extracted from the energy storage apparatus 1 is not fixed and is free. As a result, when the positive electrode connector 41 and the negative electrode connector 42 are connected as shown in FIG. 6, the position of the negative electrode connector 42 is stabilized, and the degree of freedom of the position and posture of the positive electrode connector 41 is high, so that it is easy to perform a connecting operation between the negative electrode connector 42 and the positive electrode connector 41. The position of the set of the negative electrode connector 42 and the positive electrode connector 41 in the connected state can be restricted to a predetermined position. Therefore, it is easy to visually check the connection state of each of the plurality of sets of the negative electrode connectors 42 and the positive electrode connectors 41.

1-7. Other Modification Examples Related to First Embodiment

Although the energy storage equipment 100 and the energy storage apparatuses 1 according to the first embodiment and its modification examples have been described above, the present invention is not limited to the first embodiment and the modification examples. That is, the first embodiment disclosed here and the modification examples are exemplary in all respects and not exhaustive, and the scope of the present invention includes all modifications within the meaning and scope equivalent to the claims.

For example, in the embodiment, in order to connect the plurality of energy storage apparatuses 1 arranged in the up/down direction in series, in each energy storage apparatus 1, the negative electrode connector 42 is fixed in a downward posture, but the negative electrode connector 42 may be fixed upward. A part of the positive electrode power cable 31 may be fixed such that the positive electrode connector 41 instead of the negative electrode connector 42 is in a downward or upward posture. In any case, it is sufficient that one of the negative electrode connector 42 and the positive electrode connector 41 which is not fixed can be connected to one of the negative electrode connector 42 and the positive electrode connector 41 of the upper or lower energy storage apparatus 1 which is fixed. As a result, the plurality of energy storage apparatuses 1 can be connected in series without difficulty or efficiently. The same applies to the modification example, and in each energy storage apparatus 1, the negative electrode connector 42 may be fixed not leftward but rightward. A part of the positive electrode power cable 31 may be fixed such that the positive electrode connector 41 instead of the negative electrode connector 42 is in a leftward or rightward posture. In any case, it is sufficient that one of the negative electrode connector 42 and the positive electrode connector 41 which is not fixed can be connected to one of the negative electrode connector 42 and the positive electrode connector 41 of the left or right energy storage apparatus 1 which is fixed.

It is not essential that one of the negative electrode connector 42 and the positive electrode connector 41 of the energy storage apparatus 1 is fixed. The negative electrode connector 42 and the positive electrode connector 41 of one energy storage apparatus 1 may not be connectable to each other due to the length or hardness of each of the negative electrode power cable 32 and the positive electrode power cable 31 of the energy storage apparatus 1 or due to the size or shape of each of the negative electrode connector 42 and the positive electrode connector 41. Even in this case, as long as the negative electrode connector 42 and the positive electrode connector 41 can be connected to each other between the one energy storage apparatus 1 and the adjacent upper/lower or left/right energy storage apparatus 1, the plurality of energy storage apparatuses 1 arranged in the up/down direction or the left/right direction can be connected in series, and the possibility of erroneous connection is also reduced.

When the energy storage apparatuses 1 are arranged in a direction inclined with respect to the up/down direction, in the energy storage apparatus 1, a part of the negative electrode power cable 32 or the positive electrode power cable 31 may be fixed such that the negative electrode connector 42 or the positive electrode connector 41 is oriented in a direction along the direction. As a result, the plurality of energy storage apparatuses 1 arranged in a direction inclined with respect to the up/down direction can be connected in series without difficulty or efficiently.

As shown in FIGS. 7 and 8, the corner portion 19 where the outlets of the positive electrode power cable 31 and the negative electrode power cable 32 from the outer case 18 are gathered need not be an upper right corner portion when the energy storage apparatus 1 is viewed from the front. The outlets of the positive electrode power cable 31 and the negative electrode power cable 32 from the outer case 18 may be gathered at an upper left, lower left, or lower right corner portion of the outer case 18 according to the posture of the energy storage device 11 of the energy storage unit 10, the position of the electrode terminal of the energy storage device 11, and the like.

The energy storage apparatus 1 may not include the board unit 20. That is, functions such as monitoring of the charge state of the plurality of energy storage devices 11 and voltage adjustment may be performed by an external apparatus electrically connected to the energy storage apparatus 1.

The positive electrode power cable 31 and the negative electrode power cable 32 may not be extended from the same end portion of the outer case 18 and may be extended from end portions located on opposite sides of the outer case 18 toward the outside of the outer case 18. Referring to FIG. 2, the positive electrode power cable 31 may extend from an end of the outer case 18 in the Y-axis minus direction, and the negative electrode power cable 32 may extend from an end of outer case 18 in the Y-axis plus direction. Even in this case, when the energy storage apparatus 1 can be accessed from the front surface side and the back surface side of the rack 110, the connecting operation between the positive electrode connector 41 and the negative electrode connector 42 can be performed from the front surface side and the back surface side of the rack 110. When the plurality of energy storage apparatuses 1 are placed side by side in a predetermined plane region instead of being accommodated in the rack 110, it is possible to perform a connecting operation or the like between the positive electrode connector 41 and the negative electrode connector 42 from the upper surface side of the plurality of energy storage apparatuses 1.

Second Embodiment

The structural relationship between the cables connected to the electrode terminals of each energy storage device and the insulating member disposed at a position facing the terminal placement surface of the energy storage device will be focused and described in detail as the second embodiment.

Patent Document 2 discloses an energy storage apparatus including an outer case that houses a plurality of energy storage devices and a positive electrode external terminal and a negative electrode external terminal which are provided outside the outer case. Each of the positive electrode external terminal and the negative electrode external terminal is covered with a terminal cover main body portion. The terminal cover main body is provided with an opening portion, and the terminal cover main body is rotatably attached to the positive electrode external terminal or the negative electrode external terminal such that the opening portion is disposed at a different position.

In a conventional energy storage apparatus such as the energy storage apparatus described in Patent Document 2, for example, an inner lid (insulating member) which holds a board, a bus bar, and the like is disposed above the plurality of energy storage devices. A wall portion is erected around the plate-like portion of the insulating member on which the board and the like are placed, and an electrode terminal of each of the plurality of energy storage devices is protected by the wall portion from other members on the side so as not to cause unnecessary conduction. The energy storage apparatus configured as described above sometimes uses a cable including a connection terminal such as a round terminal as a member forming a conduction path (main circuit) of a current at the time of charging and discharging with another energy storage apparatus or the like. In this case, there is a portion having a relatively large outer diameter near the connection terminal in the cable, and this causes a situation in which the cable hardly extends beyond the wall portion. Accordingly, conventionally, a structure in which the connection terminal is lifted upward by interposing another conductive member between the connection terminal and the electrode terminal is adopted. With such a configuration, the cable can be connected to the energy storage device without difficulty in a state where the cable extends beyond the wall portion of the insulating member. However, in this case, the configuration of the energy storage apparatus becomes complicated due to the necessity of another conductive member for lifting the connection terminal.

The present invention has been made by the inventors of the present application focusing newly on the above problems, and the second object of the present invention is to provide an energy storage apparatus including a plurality of energy storage devices and allowing simplification of the configuration.

The energy storage apparatus according to one aspect of the present invention includes the plurality of energy storage devices each including the terminal placement surface on which an electrode terminal is placed, the insulating member including a portion collectively covering at least a part of each of the terminal placement surfaces of the plurality of energy storage devices, and the conductive member connected to the terminal surface of the electrode terminal of the predetermined energy storage device which is one of the plurality of energy storage devices. The terminal surface is the upper surface of the electrode terminal and the lower end portion of the insulating member is positioned below the terminal surface in an up/down direction when the plurality of energy storage devices are placed in a posture in which the terminal placement surface faces upward. The insulating member includes the wall portion positioned on a side of the predetermined energy storage device. The wall portion includes the first opening portion through which the conductive member is placed so as to penetrate and which is provided in a range including the same position as the terminal surface in the up/down direction.

According to this configuration, a conductive member such as the cable connected to the terminal surface of an electrode terminal can be easily extracted to the outside of an insulating member from the same height position as the terminal surface through the first opening portion. Accordingly, even if there is a portion having a large outer diameter near the connection terminal used for connection with the electrode terminal of the conductive member, the connection terminal of the conductive member can be connected to the electrode terminal in a state of being in contact with the terminal surface of the electrode terminal. That is, it is not necessary to use another conductive member interposed between the conductive member and the terminal surface, which is necessary when the conductive member passes over the wall portion. As described above, according to the energy storage apparatus of this aspect, the configuration can be simplified.

The first opening may be a notch provided at the lower end portion of the insulating member.

According to this configuration, the insulating member can be disposed with respect to the plurality of energy storage devices in a state where the conductive member is connected to the electrode terminal. Therefore, it is possible to perform connection work (fastening of a nut or the like) of the conductive member to the electrode terminal without being disturbed by the insulating member. Therefore, according to the energy storage apparatus of this aspect, the manufacturing work can be facilitated while the configuration is simplified.

The insulating member may include a restricting portion that is positioned above the conductive member in the first opening portion and restricts upward movement of the conductive member.

According to this configuration, since the conductive member is suppressed from moving or tilting upward at the position of the first opening portion, the restricting portion functions as a temporary presser before the conductive member is connected to the electrode terminal. The semi-finished product can be easily handled after the conductive member is connected to the electrode terminal. That is, according to the energy storage apparatus of this aspect, it is possible to improve the manufacturing efficiency while simplifying the configuration.

The energy storage apparatus may further include a case which is opened at an upper side and houses the plurality of energy storage devices, wherein an upper end portion of the case is positioned above a terminal surface of the electrode terminal in the up/down direction, is disposed at a position facing the first opening portion, and includes a second opening portion through which the conductive member is placed.

With such a configuration, the case which houses the plurality of energy storage devices can cover the plurality of energy storage devices up to a height position which includes the conductive member connected to the predetermined energy storage device, and hence the insulating member can be fixed to the case. Therefore, the strength of the case as a structure covering the plurality of energy storage devices is improved. Since the second opening portion is provided in the case, the lead-out structure of the conductive member from the case is not hindered by the case. That is, according to the energy storage apparatus of this aspect, the structural stabilization is also achieved while the configuration is simplified.

The insulating member may be a bus bar frame which holds one or more bus bars which electrically connect the plurality of energy storage devices to each other.

According to this configuration, since the bus bar frame covers the portion below the terminal surface of the electrode terminal, unnecessary conduction between the electrode terminal and another member can be prevented, and the conductive member can be directly connected to the electrode terminal in a reasonable posture by the first opening portion. That is, it is possible to efficiently use an insulating member while simplifying the configuration.

According to the present invention, it is possible to provide an energy storage apparatus capable of simplifying the configuration.

2-1. Aspect of Placement of Power Cables

The general configuration of the energy storage apparatus 1 according to the present embodiment (see, for example, FIGS. 1 to 3) is common to that of the energy storage apparatus 1 according to the first embodiment, and hence, a description of the configuration is omitted here, and an aspect of the placement of power cables will be described below.

In an energy storage apparatus 1 according to the second embodiment, similarly to the energy storage apparatus 1 according to the first embodiment, a positive electrode power cable 31 and a negative electrode power cable 32 are placed in a state of being extracted from the inside to the outside of an outer case 18 at an end portion 18a of the outer case 18. The negative electrode power cable 32 is connected to a negative electrode terminal 11c of an energy storage device 11A closest to the end portion 18a of the outer case 18. Accordingly, how to place the negative electrode power cable 32 is a problem in relation to a bus bar frame 60 and an outer case body 14.

In this regard, in the present embodiment, the bus bar frame 60 and the outer case body 14 each have a structure for disposing the negative electrode power cable 32 without difficulty while being drawn from the outer case 18. Accordingly, an aspect of the placement of the positive electrode power cable 31 and the negative electrode power cable 32 in the energy storage apparatus 1 will be described below with reference to FIGS. 11 to 14, particularly focusing on the negative electrode power cable 32. Note that, in each of FIGS. 11 to 14, a plurality of components to be mainly described is shown, and an illustration of other components is appropriately omitted.

Figure 11:
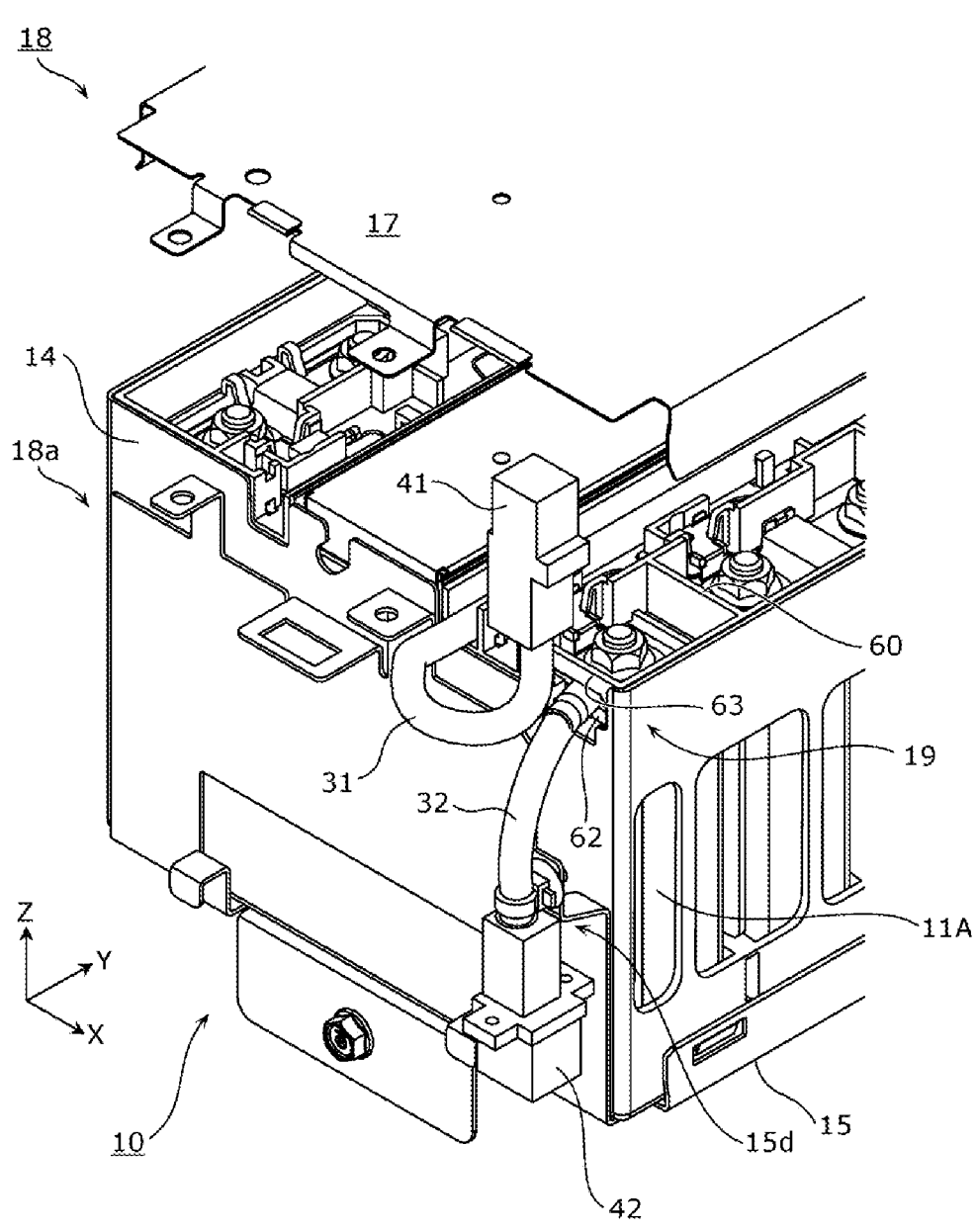
FIG. 11 is a perspective view showing the configuration of an end portion of the outer case of the energy storage unit according to the second embodiment.
Figure 12:
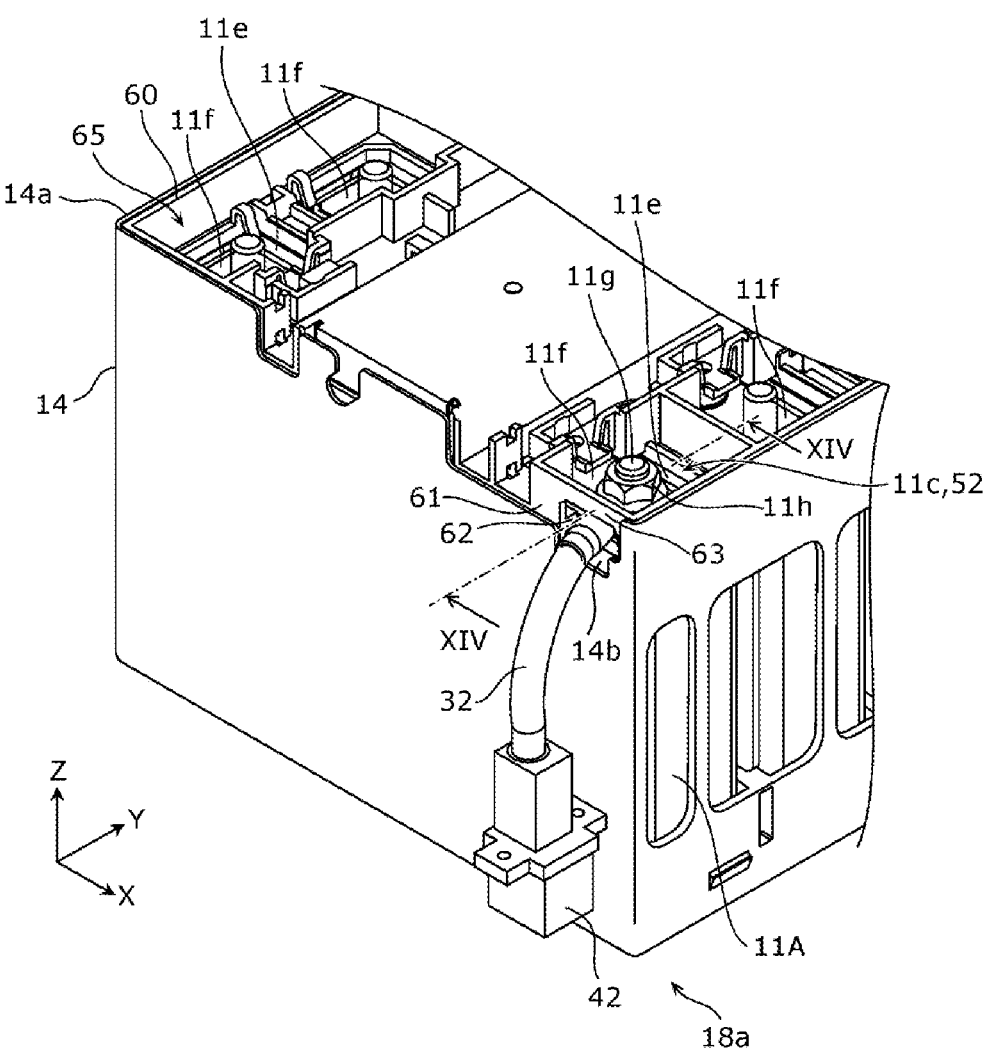
FIG. 12 is a perspective view showing the structural relationship between the bus bar frame, the outer case body, and the negative electrode power cable according to the second embodiment.
Figure 13:
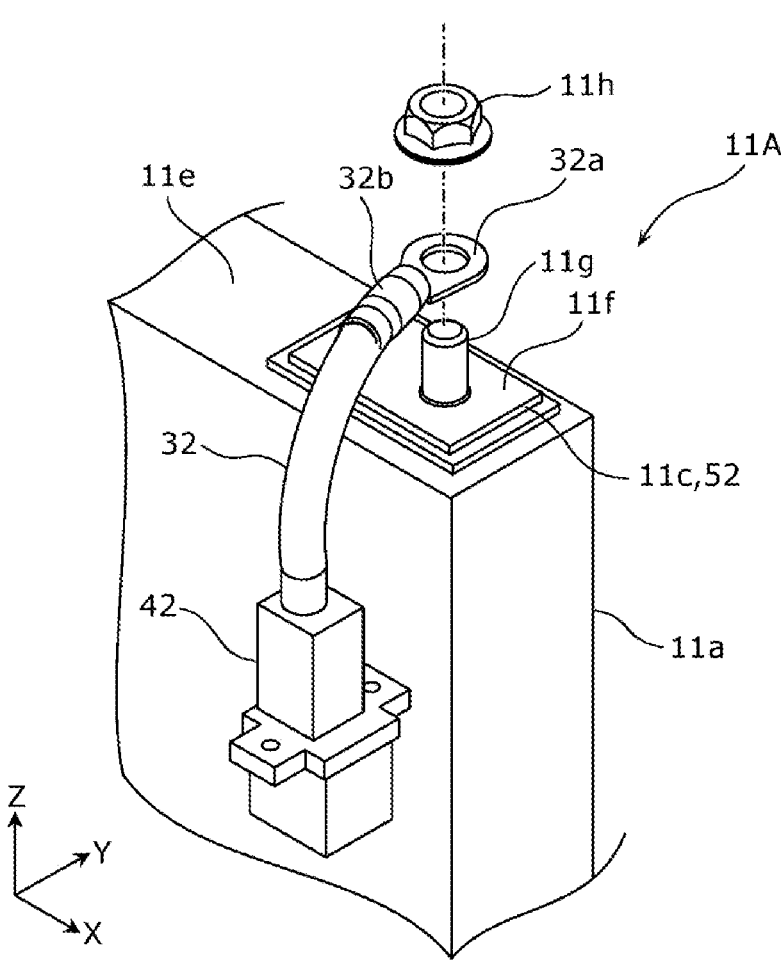
FIG. 13 is an exploded perspective view showing a connection structure between the negative electrode power cable and the energy storage device according to the second embodiment.
Figure 14:
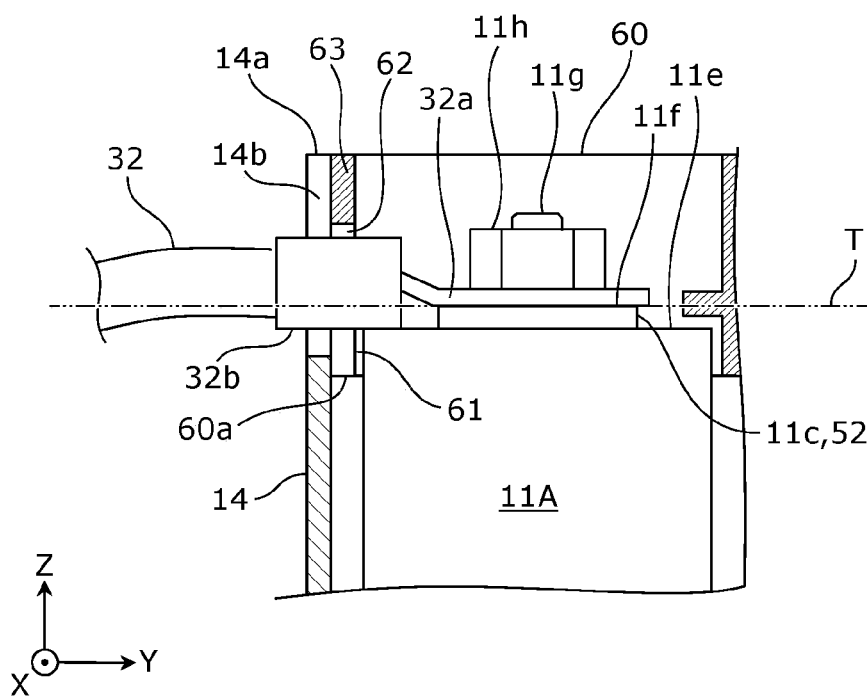
FIG. 14 is a partial cross-sectional view showing the structural relationship between the bus bar frame, the outer case body, and the negative electrode power cable according to the second embodiment.

FIG. 11 is a perspective view showing the configuration of the end portion 18a of the outer case 18 of an energy storage unit 10 according to the second embodiment. More specifically, FIG. 11 shows the end portion 18a of the outer case 18 in a state where the outer case lid body 17 is lifted from the outer case body 14. FIG. 12 is a perspective view showing the structural relationship between the bus bar frame 60, the outer case body 14, and the negative electrode power cable 32 according to the second embodiment. FIG. 13 is an exploded perspective view showing a connection structure between the negative electrode power cable 32 and the energy storage device 11A according to the second embodiment. FIG. 13 simply shows only the negative electrode terminal 11c and its periphery of the energy storage device 11A. FIG. 14 is a partial cross-sectional view showing the structural relationship between the bus bar frame 60, the outer case body 14, and the negative electrode power cable 32 according to the second embodiment. FIG. 14 shows partial cross-sections of the bus bar frame 60 and the outer case body 14 in a YZ plane passing through a line XIV-XIV of FIG. 12 and also shows the energy storage device 11A and the negative electrode power cable 32 in a side view. A two-dot chain line T in FIG. 14 indicates the position of a terminal surface 11f of the negative electrode terminal 11c in the up/down direction (Z-axis direction). In the present embodiment, the terminal surfaces 11f of positive electrode terminals 11b and the negative electrode terminals 11c of the plurality of energy storage devices 11 of the energy storage apparatus 1 are placed at substantially the same position (the position of two-dot chain line T) in the up/down direction.

As shown in FIG. 11, the positive electrode power cable 31 and the negative electrode power cable 32 are placed while extending from the inside of the outer case 18 to the outside. More specifically, both the positive electrode power cable 31 and the negative electrode power cable 32 extend from the end portion 18a of the outer case 18 toward the outside of the outer case 18. The positive electrode power cable 31 has the positive electrode connector 41, and the negative electrode power cable 32 has the negative electrode connector 42. Although not shown in FIG. 11, the positive electrode connector 41 and the negative electrode connector 42 each are provided with a terminal or the like serving as an electrical contact with the other.

In the present embodiment, the positive electrode connector 41 and the negative electrode connector 42 have structures that allow direct connection with each other. One of the negative electrode connector 42 and the positive electrode connector 41 is mechanically connected (insertion, fitting, screwing, or the like) to the other, thereby electrically connecting the negative electrode connector 42 and the positive electrode connector 41 to each other. With such a configuration, the one positive electrode connector 41 and the other negative electrode connector 42 of the two adjacent energy storage apparatuses 1 can be easily connected to each other without using a tool such as a wrench. Therefore, when the plurality of energy storage apparatuses 1 are arranged in a row in the up/down direction or the left/right direction with the end portions 18a oriented in the same direction, the plurality of energy storage apparatuses 1 can be easily connected in series as a whole.

The positive electrode connector 41 and the negative electrode connector 42 of the one energy storage apparatus 1 are placed in a state where direct connection with each other is impossible. More specifically, as shown in FIG. 11, at least a part of the portion of the negative electrode power cable 32 which extends from the outer case 18 is fixed to the energy storage unit 10. In the present embodiment, a metal base member 15 has a fixing portion 15d for fixing at least a part of the negative electrode power cable 32, thereby fixing the negative electrode connector 42 substantially downward. As the fixing portion 15 d, a binding member (for example, referred to as a push mount tie) is adopted which binds a part of the negative electrode power cable 32 including the negative electrode connector 42 and is fixed to a recess or a hole formed in the base member 15. The fixing structure of the fixing portion 15d is not particularly limited. A part of the negative electrode power cable 32 may be embedded in a recessed portion (a groove, notch, slit, or the like) provided in the outer case 18 or a recessed portion of a member fixed to the outer case 18 to fix the part of the negative electrode power cable 32.

As described above, in a state where the posture of the negative electrode connector 42 is restricted, in a case where the length of the portion of the positive electrode power cable 31 extending from a corner portion 19 of the outer case 18 is as long as shown in FIG. 11, it is impossible to directly connect the negative electrode connector 42 and the positive electrode connector 41. Accordingly, it is possible to substantially prevent erroneous connection between the positive electrode connector 41 and the negative electrode connector 42 which may cause a short circuit of the energy storage apparatus 1.

In such a configuration, on the bus bar frame 60 disposed at a position facing terminal placement surfaces 11e of the plurality of energy storage devices 11, wall portions 61 are erected so as to surround portions parallel to the XY direction where a plurality of bus bar openings 65 are provided (see FIGS. 3, 12, and 14). This reduces the possibility that other elements are brought into contact with the positive electrode terminal 11b and a negative electrode terminal 11c of the plurality of energy storage devices 11 from the side. That is, unnecessary conduction in each energy storage device 11 is suppressed.

However, the wall portion 61 of the bus bar frame 60 may cause a problem of interference with the negative electrode power cable 32 connected to the negative electrode terminal 11c of the energy storage device 11A. More specifically, in the present embodiment, as shown in FIGS. 12 to 14, the negative electrode power cable 32 has a connection terminal 32a that is a round terminal at an end portion, and an insulating cover 32b that covers a crimped portion between the electric wire of the negative electrode power cable 32 and the connection terminal 32a is disposed at the proximal end of the connection terminal 32a. Accordingly, there is a portion (large-diameter portion) having a relatively large outer diameter near the connection terminal 32a in the negative electrode power cable 32. A nut 11h is used for connecting the connection terminal 32a and the negative electrode terminal 11c near which the large-diameter portion exists as described above. More specifically, the negative electrode terminal 11c has a connection shaft 11g having a screw thread formed on the outer periphery, and the nut 11h is fastened in a state where the connection shaft 11g penetrates through the connection terminal 32a, thereby bringing the connection terminal 32a into surface contact with the terminal surface 11f. As a result, a fastening force by the nut 11h acts on the end portion of the negative electrode power cable 32 where the connection terminal 32a is provided so as to take a posture substantially parallel to the terminal surface 11f.

On the other hand, in order to reliably insulate the electrode terminals (11b and 11c) of the respective energy storage devices 11 from other members on the side, a lower end portion 60a of the bus bar frame 60 is preferably positioned below the terminal surface 11f of the electrode terminal (the negative electrode terminal 11c in FIG. 14). That is, the wall portion 61 which is relatively long in the up/down direction is disposed on a side of the negative electrode terminal 11c.

In such a configuration, in the present embodiment, the wall portion 61 of the bus bar frame 60 is provided with a first opening portion 62 in a range including the position of the terminal surface 11f of the negative electrode terminal 11c (the position of the two-dot chain line T in FIG. 14). Accordingly, the negative electrode power cable 32 can be easily disposed without difficulty.

2-2. Description of Effects

The energy storage apparatus 1 according to the second embodiment includes the plurality of energy storage devices 11 each having the terminal placement surface 11e on which an electrode terminal is placed, the bus bar frame 60, and the negative electrode power cable 32. On the terminal placement surface 11e, the positive electrode terminal 11b and the negative electrode terminal 11c are placed as electrode terminals. The bus bar frame 60 includes a portion which collectively covers at least a part of each of the terminal placement surfaces 11e of the plurality of energy storage devices 11. The negative electrode power cable 32 is connected to the terminal surface 11f of the negative electrode terminal 11c of the energy storage device 11A which is one of the plurality of energy storage devices 11. When the plurality of energy storage devices 11 are placed in a posture where the terminal placement surface 11e faces upward, the terminal surface 11f is the upper surface of the negative electrode terminal 11c, and the lower end portion 60a of the bus bar frame 60 is positioned below the terminal surface 11f in the up/down direction. The bus bar frame 60 includes the wall portion 61 positioned on a side of the energy storage device 11A. The wall portion 61 has the first opening portion 62 through which negative electrode power cable 32 is placed so as to penetrate, and the first opening portion 62 provided in a range including the same position as the terminal surface 11f in the up/down direction.

According to this configuration, as shown in FIGS. 12 and 14, the negative electrode power cable 32 connected to the terminal surface 11f of the negative electrode terminal 11c can be easily extracted from the same height position as the terminal surface 11f to the outside of the bus bar frame 60 through the first opening portion 62. Accordingly, even when the negative electrode power cable 32 has a large-diameter portion (particularly, a portion where the insulating cover 32b is placed) exists, the connection terminal 32a of the negative electrode power cable 32 can be connected to the negative electrode terminal 11c in a state where the connection terminal 32a is in contact with the terminal surface 11f of the negative electrode terminal 11c. That is, it is not necessary to use another conductive member interposed between the connection terminal 32a and the terminal surface 11f, which is necessary when the negative electrode power cable 32 is made to pass over the wall portion 61. As described above, the energy storage apparatus 1 according to the present embodiment, the configuration allows simplification of the configuration.

In the present embodiment, more specifically, the first opening portion 62 is placed in a range including the same position as the terminal surface 11f and including the terminal placement surface 11e or less in the up/down direction. As a result, as shown in FIG. 14, even in a state where a part of the negative electrode power cable 32 including the insulating cover 32b is in contact with the terminal placement surface 11e, the problem of interference between the negative electrode power cable 32 and the bus bar frame 60 hardly occurs. Therefore, such a defect that one of the negative electrode power cable 32 and the bus bar frame 60 damages the other due to vibration, impact, or the like hardly occurs.

In the present embodiment, the bus bar frame 60 including the first opening portion 62 is placed in contact with the terminal placement surfaces 11e of the plurality of energy storage devices 11. Accordingly, the bus bar frame 60 also functions as a restricting member which restricts the upward movement of the plurality of energy storage devices 11 by being directly or indirectly fixed to the outer case 18. The bus bar frame 60 may be fixed to the terminal placement surfaces 11e of the plurality of energy storage devices 11 with, for example, an adhesive. With such a configuration, the stability of the positions of the plurality of energy storage devices 11 can be enhanced, and the expansion of each of the plurality of energy storage devices 11 can be suppressed. The strength of the entire outer case 18 including the bus bar frame 60 is also improved.

In the present embodiment, one insulating member (bus bar frame 60) that further ensures electrical insulation between these electrode terminals and other members is placed for the plurality of positive electrode terminals 11b and the plurality of negative electrode terminals 11c. Therefore, as compared with the case where an insulating member is provided for each of the plurality of electrode terminals, the energy storage apparatus 1 can be manufactured more efficiently, and the number of parts required for manufacturing is also reduced. In the case where the insulating member including an identical structure is provided for each of the plurality of electrode terminals, the opening portion through which the power cable penetrates is formed in all the insulating members. As a result, the opening portion of the insulating member is always located on a side of all the electrode terminals. That is, an originally unnecessary (un-used) opening portion exists on a side of one or more electrode terminals. This is disadvantageous from the viewpoint of reliability of electrical insulation between the electrode terminals and other members. In this regard, in the present embodiment, one bus bar frame 60 is disposed for the plurality of positive electrode terminals 11b and the plurality of negative electrode terminals 11c, and the first opening portion 62 can be formed in the bus bar frame 60 only at a portion through which the power cable penetrates. Accordingly, it is possible to prevent an originally unnecessary opening portion from being placed on a side of each of the plurality of positive electrode terminals 11b and the plurality of negative electrode terminals 11c.

In the present embodiment, as shown in FIGS. 3 and 14, the first opening portion 62 is a notch provided in the lower end portion 60a of the bus bar frame 60.

With such a configuration, the bus bar frame 60 can be placed with respect to the plurality of energy storage devices 11 in a state where the negative electrode power cable 32 is connected to the negative electrode terminal 11c. Therefore, a connecting operation (fastening of the nut 11h or the like in the present embodiment) of the negative electrode power cable 32 to the negative electrode terminal 11c can be performed without being disturbed by the bus bar frame 60. Therefore, the energy storage apparatus 1 according to the present embodiment facilitates the manufacturing work while simplifying the configuration.

In the present embodiment, the bus bar frame 60 includes the restricting portion 63. As shown in FIGS. 12 and 14, the restricting portion 63 is positioned above the negative electrode power cable 32 in the first opening portion 62 and restricts upward movement of the negative electrode power cable 32.

According to this configuration, since the negative electrode power cable 32 is suppressed from moving or tilting upward at the position of the first opening portion 62, the restricting portion 63 functions as a temporary presser before the negative electrode power cable 32 is connected to the negative electrode terminal 11c. After the negative electrode power cable 32 is connected to the negative electrode terminal 11c, the semi-finished product can be easily handled. That is, the energy storage apparatus 1 according to the present embodiment allows simplification of the configuration and improvement in manufacturing efficiency As in the present embodiment, when the restricting portion 63 is provided in a bridge shape so as to connect the left and right portions of first opening portion 62, the wall portion 61 is continuous across the first opening portion 62 (not separated by the first opening portion 62). Therefore, a decrease in the strength of the bus bar frame 60 due to the provision of the first opening portion 62 in the bus bar frame 60 is suppressed.

In the present embodiment, the energy storage apparatus 1 includes the outer case body 14 which is the outer case body 14 whose upper side is opened and which houses the plurality of energy storage devices 11. An upper end portion 14a of the outer case body 14 (see FIGS. 12 and 14) is positioned above the terminal surface 11f of the negative electrode terminal 11c in the up/down direction. The outer case body 14 has a second opening portion 14b. The second opening portion 14b is placed at a position facing the first opening portion 62. The negative electrode power cable 32 is placed so as to penetrate through the second opening portion 14 b.

With such a configuration, the outer case body 14 which accommodates the plurality of energy storage devices 11 can cover the plurality of energy storage devices 11 up to a height position where the negative electrode power cable 32 connected to the energy storage device 11A is included. Accordingly, the bus bar frame 60 can be fixed to the outer case body 14. Accordingly, the strength of the outer case body 14 as a structure covering the plurality of energy storage devices 11 is improved. Since the second opening portion 14*b* is provided in the outer case body 14, a structure in which the negative electrode power cable 32 is extracted from the outer case body 14 is not hindered by the outer case body 14. That is, the energy storage apparatus 1 according to the present embodiment allows simplification of the configuration and structural stabilization.

In the present embodiment, the insulating member which is placed to face the terminal placement surfaces 11*e* of the plurality of energy storage devices 11 and has the first opening portion 62 is the bus bar frame 60. The bus bar frame 60 is a member which holds one or more bus bars 13 which electrically connect the plurality of energy storage devices 11.

That is, in the present embodiment, since the bus bar frame 60 having a role of positioning the plurality of bus bars 13 covers up to a portion below the terminal surface 11*f* of the electrode terminals (11*b* and 11*c*), it is possible to prevent unnecessary conduction between the electrode terminals (11*b* and 11*c*) and other members. Since the bus bar frame 60 includes the first opening portion 62, the negative electrode power cable 32 can be directly connected to the negative electrode terminal 11*c* which is an electrode terminal to be connected in a reasonable posture. That is, the energy storage apparatus 1 according to the present embodiment allows simplification of the configuration and efficient use of the bus bar frame 60.

2-3. Other Modification Examples Related to Second Embodiment

Although the energy storage apparatus 1 according to the second embodiment has been described above, the present invention is not limited to the above second embodiment. That is, the second embodiment disclosed here is exemplary in all respects and not exhaustive, and the scope of the present invention includes all modifications within the meaning and scope equivalent to the claims.

The embodiment has exemplified the case where the conductive member placed so as to penetrate through the first opening portion 62 of the bus bar frame 60 and the second opening portion 14*b* of the outer case body 14 is the negative electrode power cable 32. However, the conductive member placed so as to penetrate through first opening portion 62 and second opening portion 14*b* may be the positive electrode power cable 31. When the negative electrode power cable 32 and the positive electrode power cable 31 are placed in a state of being extracted from an end portion of the outer case 18 on a side opposite to the end portion 18*a*, the first opening portion 62 and the second opening portion 14*b* may be provided on a side of the end portion. With such a configuration, the negative electrode power cable 32 which is connected to the positive electrode terminal 11*b* of an energy storage device 11B located closest to the above end portion can be placed beyond the bus bar frame 60 and the outer case body 14 without difficulty through the first opening portion 62 and the second opening portion 14*b*.

In the energy storage unit 10, the outer case which holds the plurality of energy storage devices 11 does not necessarily have a box shape as shown in FIG. 2. A binding member which binds the plurality of energy storage devices 11 in the placement direction of the devices by a pair of end plates and a connecting member which connects the pair of end plates may be provided in the energy storage apparatus 1 as the outer case. In this case, by providing the second opening portion in at least one of the pair of end plates, the negative electrode power cable 32 or the positive electrode power cable 31 can be placed without difficulty and without causing the upper end portion to interfere with the end plate positioned above the terminal surface 11*f* in the up/down direction.

The shape of the first opening portion 62 of the bus bar frame 60 is not limited to the shape shown in FIGS. 3, 12, and 14 and the like. The restricting portion 63 positioned on the first opening portion 62 may be provided in a cantilever shape extending only from one of the left and right portions of the first opening portion 62 instead of a bridge shape connecting the left and right portions of the first opening portion 62. In this case, the first opening portion 62 has a shape opened at the upper end of the wall portion 61. This facilitates placing the negative electrode power cable 32 after the bus bar frame 60 is placed with respect to the plurality of energy storage devices 11. The first opening portion 62 is not necessarily provided in a notch shape from the lower end portion 60*a* of the bus bar frame 60, and a simple through hole provided in the wall portion 61 may be provided in the bus bar frame 60 as the first opening portion 62.

The shape of the second opening portion 14*b* of the outer case body 14 is not limited to the shape shown in FIG. 12 and the like. The outer case body 14 may have a restricting portion positioned above the negative electrode power cable 32 in the second opening portion 14*b*. In this case, the restricting portion may be provided in a bridge shape connecting the left and right portions of the second opening portion 14*b* or may be provided in a cantilever shape extending only from one of the left and right portions. When the restricting portion is formed in a bridge shape, the second opening portion 14*b* is formed by a through hole provided in the outer case body 14. When the restricting portion is provided in a cantilever shape, a portion of the second opening portion 14*b* which is opened to the upper end portion 14*a* of the outer case body 14 is left. This facilitates a placing operation for the negative electrode power cable 32 after the bus bar frame 60 is placed with respect to the outer case body 14.

The insulating member placed opposite to the terminal placement surfaces 11*e* of the plurality of energy storage devices 11 may be other than the bus bar frame 60. A member (for example, an inner lid) which holds electric equipment such as a control circuit and wiring and does not have a function of holding the bus bar 13 or a member (for example, an outer lid) which protects the plurality of energy storage devices and a member above the plurality of energy storage devices 11 may be placed as an insulating member. Even in this case, when the lower end portion of the inner lid or the outer lid is positioned below the terminal surface 11*f* in the up/down direction, the inner lid or the outer lid may have the first opening portion provided in a range including the same position as the terminal surface 11*f* in the up/down direction. With such a configuration, the negative electrode power cable 32 or the positive electrode power cable 31 connected to the energy storage device 11A or 11B can be placed in a state where the negative electrode power cable or the positive electrode power cable is extracted from the inner lid or the outer lid to the outside without difficulty through the first opening portion.

In each energy storage apparatus 1 according to the embodiment, the negative electrode connector 42 is fixed in the downward posture, but the negative electrode connector 42 may be fixed upward. A part of the positive electrode power cable 31 may be fixed such that the positive electrode connector 41 instead of the negative electrode connector 42 is in a downward or upward posture. The orientation of the negative electrode connector 42 or the positive electrode connector 41 whose posture is substantially fixed is not necessarily the up/down direction, and may be the left/right direction. It is not essential that one of the negative electrode connector 42 and the positive electrode connector 41 of the energy storage apparatus 1 is fixed.

The energy storage apparatus 1 may not include the board unit 20. That is, functions such as monitoring of the charge state of the plurality of energy storage devices 11 and voltage adjustment may be performed by an external apparatus electrically connected to the energy storage apparatus 1.

INDUSTRIAL APPLICABILITY

The present invention can be applied to an energy storage apparatus including an energy storage device such as a lithium ion secondary battery.

DESCRIPTION OF REFERENCE SIGNS

1, 1A to 1J: energy storage apparatus
10: energy storage unit
11, 11A, 11B: energy storage device
11*a*: case
11*b*: positive electrode terminal
11*c*: negative electrode terminal
11*e*: terminal placement surface
11*f*: terminal surface
11*g*: connection shaft
11*h*: nut
12: spacer
13: bus bar
13*a*: detection cable
13*b*: connector
14: outer case body
14*a*: upper end portion
14*b*: second opening portion
15: base member
15*a*: bottom portion
15*b*, 15*c*, 17*b*, 17*c*: connecting portion
15*d*, 15*f*, 120*b*: fixing portion
15*g*: fixing member
15*h*: fixing piece
15*i*: fixing hole
16: board unit attachment portion
17: outer case lid body
17*a*: top portion
18: outer case
18*a*: end portion
19, 19*a*, 19*b*: corner portion
19*c*: vertex
20: board unit
21: board case
25: board
31, 31A: positive electrode power cable
32, 32A, 32B: negative electrode power cable

32*a*: connection terminal
32*b*: insulating cover
41, 41A, 41C: positive electrode connector
42, 42A to 42E: negative electrode connector
51: positive electrode connection terminal
52: negative electrode connection terminal
60: bus bar frame
60*a*: lower end portion
61: wall portion
62: first opening portion
63: restricting portion
65: bus bar opening
91, 92: connection cable
100: energy storage equipment
110: rack
120: shelf plate
120*a*: front end surface
150: electric circuit unit
200, 200A to 200E: energy storage apparatus array

The invention claimed is:

1. An energy storage apparatus comprising:
an energy storage unit including a plurality of energy storage devices;
a first power cable connected to one of a positive electrode connection terminal of the energy storage unit and a negative electrode connection terminal of the energy storage unit and extending from an end portion of the energy storage unit to an outside of the energy storage unit; and
a second power cable connected to the other of the positive electrode connection terminal and the negative electrode connection terminal of the energy storage unit and extending from the end portion of the energy storage unit to the outside of the energy storage unit,
wherein the first power cable includes a first connector,
wherein the second power cable includes a second connector including a structure which allows direct connection to the first connector,
wherein the first power cable is fixed to the energy storage unit in a posture which inhibits connection between the first connector and the second connector of the same energy storage apparatus, and
wherein the second power cable is configured to be connected to only one predetermined energy storage apparatus among an energy storage apparatus to a left side of the energy storage apparatus, an energy storage apparatus to a right side of the energy storage apparatus, an energy storage apparatus above the energy storage apparatus, and an energy storage apparatus below the energy storage apparatus.

2. The energy storage apparatus according to claim 1, wherein the first power cable is placed in the posture which inhibits connection between the first connector and the second connector by fixing a portion of the first power cable to the energy storage unit, the portion extending from the energy storage unit, and maintaining fixation.

3. The energy storage apparatus according to claim 2, wherein the energy storage unit further includes a plate-like base member that supports the plurality of energy storage devices, and the base member includes a fixing portion that fixes the first power cable.

4. The energy storage apparatus according to claim 1, wherein the first connector is placed in the posture in a direction opposite to a direction in which the second connector is inserted into a first connector of another energy storage apparatus when the second connector is connected to the first connector of the another energy storage apparatus.

5. The energy storage apparatus according to claim 1, further comprising a board unit including a board electrically connected to the energy storage unit, the board unit being placed outside of the end portion of the energy storage unit.

6. The energy storage apparatus according to claim 1, wherein at least a part of a portion of the first power cable extending from the energy storage unit is fixed to the energy storage unit, and wherein the second power cable extending from the energy storage unit is not fixed to the energy storage unit.

7. An energy storage apparatus comprising:

an energy storage unit including a plurality of energy storage devices;

a first power cable connected to one of a positive electrode connection terminal of the energy storage unit and a negative electrode connection terminal of the energy storage unit and extending from an end portion of the energy storage unit to an outside of the energy storage unit; and a second power cable connected to the other of the positive electrode connection terminal and the negative electrode connection terminal of the energy storage unit and extending from the end portion of the energy storage unit to the outside of the energy storage unit, wherein the first power cable includes a first connector, wherein the second power cable includes a second connector including a structure which allows direct connection to the first connector, wherein the first power cable is fixed to the energy storage unit in a posture which inhibits connection between the first connector and the second connector of the same energy storage apparatus, wherein at least a part of a portion of the first power cable extending from the energy storage unit is fixed to the energy storage unit, and wherein the second power cable extending from the energy storage unit is not fixed to the energy storage unit.

8. The energy storage apparatus according to claim 7, wherein the first power cable is placed in the posture which inhibits connection between the first connector and the second connector by fixing a portion of the first power cable to the energy storage unit, the portion extending from the energy storage unit, and maintaining fixation.

9. The energy storage apparatus according to claim 8, wherein the energy storage unit further includes a plate-like base member that supports the plurality of energy storage devices, and the base member includes a fixing portion that fixes the first power cable.

10. The energy storage apparatus according to claim 7, wherein the first connector is placed in the posture in a direction opposite to a direction in which the second connector is inserted into a first connector of another energy storage apparatus when the second connector is connected to the first connector of the another energy storage apparatus.

11. The energy storage apparatus according to claim 7, further comprising a board unit including a board electrically connected to the energy storage unit, the board unit being placed outside of the end portion of the energy storage unit.

12. An energy storage equipment comprising:

an energy storage apparatus; and a rack including a shelf plate on which the energy storage apparatus is mounted, wherein the energy storage apparatus includes:

an energy storage unit including a plurality of energy storage devices;

a first power cable connected to one of a positive electrode connection terminal of the energy storage unit and a negative electrode connection terminal of the energy storage unit and extending from an end portion of the energy storage unit to an outside of the energy storage unit; and a second power cable connected to the other of the positive electrode connection terminal and the negative electrode connection terminal of the energy storage unit and extending from the end portion of the energy storage unit to the outside of the energy storage unit, wherein the first power cable includes a first connector, wherein the second power cable includes a second connector including a structure which allows direct connection to the first connector, wherein the first power cable is fixed to the energy storage unit in a posture which inhibits connection between the first connector and the second connector of the same energy storage apparatus, and wherein the second power cable is connected to other energy storage apparatus accommodated in the rack.

13. The energy storage equipment according to claim 12, wherein at least a part of a portion of the first power cable extending from the energy storage unit is fixed to the energy storage unit, and the second power cable extending from the energy storage unit is not fixed to the energy storage unit.

14. The energy storage equipment according to claim 12, wherein the energy storage apparatus further includes a board unit including a board electrically connected to the energy storage unit, the board unit being placed outside of the end portion of the energy storage unit.

15. The energy storage equipment according to claim 12, wherein the energy storage unit has a rectangular parallel-epiped shape wherein the first power cable and the second power cable extend to the outside of the energy storage unit from a corner portion of the energy storage unit that is a part of the end portion of the energy storage unit, and wherein the first connector and the second connector are disposed such that positions in a front/rear direction of the first connector and the second connector are located at or near a front end face of the shelf plate.

16. The energy storage equipment according to claim 12, wherein the energy storage unit has a rectangular parallel-epiped shape wherein the first power cable and the second power cable each extend to the outside of the energy storage unit from different corner portions of the energy storage unit, and wherein the first connector and the second connector are disposed such that positions in a front/rear direction of the first connector and the second connector are located at or near a front end face of the shelf plate.

17. The energy storage equipment according to claim 12, further comprising an electric circuit unit, and a connection cable, wherein the energy storage apparatus is electrically connected to the electric circuit unit by the connection cable.

18. The energy storage equipment according to claim 12, wherein the first connector and the second connector are aligned in an up/down direction.

19. The energy storage equipment according to claim 12, wherein the first connector and the second connector are aligned in a left/right direction.

20. The energy storage equipment according to claim 12, wherein the shelf plate includes a fixing portion to which the second power cable is fixed.

* * * * *